(12) United States Patent
Bard et al.

US010653574B2

(10) Patent No.: US 10,653,574 B2
(45) Date of Patent: May 19, 2020

(54) MEDICAL WALKER DOCKING STATION (IMWDS)

(71) Applicants: Robert Alan Bard, Loveladies, NJ (US); Eleanor H Bard, Loveladies, NJ (US); Conne G Bard, Ocean, NJ (US); Douglas Aaron Bard, Brielle, NJ (US); Joshua Alan Bard, Oakhurst, NJ (US)

(72) Inventors: Robert Alan Bard, Loveladies, NJ (US); Eleanor H Bard, Loveladies, NJ (US); Conne G Bard, Ocean, NJ (US); Douglas Aaron Bard, Brielle, NJ (US); Joshua Alan Bard, Oakhurst, NJ (US)

(*) Notice: Subject to any disclaimer, the term of this patent is extended or adjusted under 35 U.S.C. 154(b) by 50 days.

(21) Appl. No.: 15/811,539

(22) Filed: Nov. 13, 2017

(65) Prior Publication Data

US 2019/0142664 A1 May 16, 2019

(51) Int. Cl.
| | | |
|---|---|---|
| *A61G 5/14* | (2006.01) | |
| *F16M 11/04* | (2006.01) | |
| *A61H 3/04* | (2006.01) | |
| *A61H 1/00* | (2006.01) | |
| *A61H 3/00* | (2006.01) | |

(52) U.S. Cl.
CPC ............ *A61G 5/14* (2013.01); *A61H 1/00* (2013.01); *A61H 3/00* (2013.01); *A61H 3/04* (2013.01); *F16M 11/04* (2013.01); *A61G 2203/22* (2013.01); *A61H 2201/0157* (2013.01); *A61H 2201/0161* (2013.01); *A61H 2201/0192* (2013.01); *A61H 2201/164* (2013.01); *A61H 2201/1635* (2013.01); *F16M 2200/08* (2013.01)

(58) Field of Classification Search
CPC ........ A61G 5/14; A61G 2203/22; A61H 3/04; F16M 11/04; F16M 2200/08
See application file for complete search history.

(56) References Cited

U.S. PATENT DOCUMENTS

| | | | | |
|---|---|---|---|---|
| 3,085,258 A | * | 4/1963 | Wolferts | A61H 3/00 135/67 |
| 3,272,530 A | * | 9/1966 | Klassen | A61G 7/1038 188/5 |
| 4,843,661 A | * | 7/1989 | Skibinski | A61G 7/1038 5/81.1 HS |
| 4,987,912 A | * | 1/1991 | Taylor | A61H 3/00 135/67 |

(Continued)

*Primary Examiner* — Anita M King

(57) ABSTRACT

A device for assisting a medical walker user in transitioning from a sitting position to a standing position as the medical walker user attempts to access the medical walker because the device incorporates a platform base which becomes stabilized by placing the weight of the medical walker user on the platform base which in turn stabilizes the medical walker via each automatic movement restrictor assembly (AMRA) attached to the platform base because each AMRA automatically engages/captures each of the medical walker's two front axles as the medical walker's two front wheels impact each of the two AMRAs additionally such that the device will automatically move from a position of engagement with the medical walker's two front axles to a position of disengagement with the medical walker's two front axles when the medical walker along with the medical walker's two front wheels leave/exit the device's AMRAs.

1 Claim, 47 Drawing Sheets

(56) References Cited

U.S. PATENT DOCUMENTS

| | | | | |
|---|---|---|---|---|
| 5,449,013 A | * | 9/1995 | Landers | A61G 7/053 |
| | | | | 135/67 |
| 9,775,767 B1 | * | 10/2017 | Khaligh | A61H 3/04 |
| 2009/0301533 A1 | * | 12/2009 | Caldwell | A61H 3/04 |
| | | | | 135/67 |
| 2015/0129735 A1 | * | 5/2015 | Bard | A61H 3/04 |
| | | | | 248/346.04 |
| 2018/0214337 A1 | * | 8/2018 | Hubert | A61H 3/04 |

\* cited by examiner

MEDICAL WALKER DOCKING STATION (IMWDS)

PRIORITY AND RELATED APPLICATIONS

The present application claims priority to the following: U.S. Pat. No. 9,439,825 B2 issued Sep. 13, 2016 entitled "Walker Docking Station" which is incorporated herein; U.S. Provisional Patent Application Ser. No. 62/423,578 filed on Nov. 17, 2016 entitled "An Apparatus Which Stabilizes A Medical Walker In The Following Two Manners: First, Employing A Medical Walker's Two Front Wheels To Automatically Assist In Capturing The Medical Walker's Two Front Axles and Second, Employing One Or More Stabilizing Rotatable Extension Arms/Bars/Rods Attached To And Pivotable From The Back Side Of The Apparatus" which is incorporated herein; and U.S. Provisional Patent Application Ser. No. 62/451,026 filed on Jan. 26, 2017 entitled "Automatic Walker Docking Station".

FIELD OF THE INVENTION

The present invention relates generally to devices and methods to assist a person who requires the use of a medical walker to transition from a sitting position to a standing position.

BACKGROUND OF THE INVENTION

Medical walkers are common moving aids to assist limited mobility people in moving around. These people also have difficulty in transitioning from a sitting position to a standing position and thus often need assistance, which can be difficult, such as requiring the assistance of another person or the assistance of a power device. There are existing devices to assist limited mobility people to sit and to rise, however, these devices are complicated and, in general, difficult to utilize. Thus, there is a need for a simple portable device to be used in conjunction with a medical walker that enables a person to transition from a sitting position to a standing position in order to directly access a medical walker such that the portable device is easy/simple to use, simple in construction and easily adjustable.

SUMMARY OF THE INVENTION

The present invention relates to medical walkers and methods to stabilize a medical walker when a person using the medical walker transitions from a sitting position to a standing position as the person directly accesses the medical walker.

The Improved Medical Walker Docking Station (IMWDS) is an improvement over the Walker Docking Station (WDS) specified in U.S. Pat. No. 9,439,825 B2 issued Sep. 13, 2016 in that the capture plates are automatically actuated up from the horizontal non engaged position to the approximately vertical engaged capture position via only the interaction from the movement of the medical walker's front wheels against the capture plates of the IMWDS as the medical walker is moved backwards towards the front of the IMWDS versus the requirement by the WDS that a separate extra operation by hand is needed for the capture plate to be brought up to the engaged capture position. Obviously, the IMWDS and the WDS both do have the same aim which is to help to prevent the unstable lifting of the medical walker's front legs which poses a significant problem when the medical walker user tries to make the transition from a sitting position to a standing position as the medical walker user accesses the medical walker by pulling on the medical walker's handles, and without stabilization, causing the medical walker's front legs to lift up and/or move unsafely back towards the user of the medical walker whereby the medical walker user could lose his or her balance and fall. The loss of balance and falling of the medical walker user could not only result in injury to the medical walker user but also to the aide or caregiver who may be trying to assist the medical walker user. Informationally, the capture plate with its cutout is one part of the capture system which includes a hinge which attaches the capture plate to the platform base and which taken together is referred to as the Automatic Movement Restrictor Assembly (AMRA). Also, the IMWDS is primarily designed to be used with medical walkers that have front wheels attached via axles where there is a small amount of space between the medical walker's front leg and the front wheel. Additionally, a medical walker without front wheels could be modified to work with the IMWDS, however, the intent is to use the IMWDS with a medical walker that has a wheel attached to each front leg via an axle attached directly to each front leg.

BRIEF DESCRIPTION OF THE DRAWINGS

The present invention may be further understood from the following description in conjunction with the drawings:

FIGS. 24 and 25 are illustrations of the front and side views respectively of the initial uninstalled disengaged positioning of the medical walker's front leg, axle and wheel relative to the front of the IMWDS.

FIGS. 26 and 27 are illustrations of the front and side views respectively of the AMRA's MWCP having partially interacted with the medical walker's front wheel with FIG. 26 showing the AMRA's MWCP at an angle between 0 degrees and 90 degrees relative to the horizontal surface of the IMWDS's platform base.

FIGS. 28 and 29 are illustrations of the front and side views respectively of the AMRA's MWCP having become fully engaged with the medical walker's front wheel's axle.

DETAILED DESCRIPTION OF THE INVENTION

Figure 1:
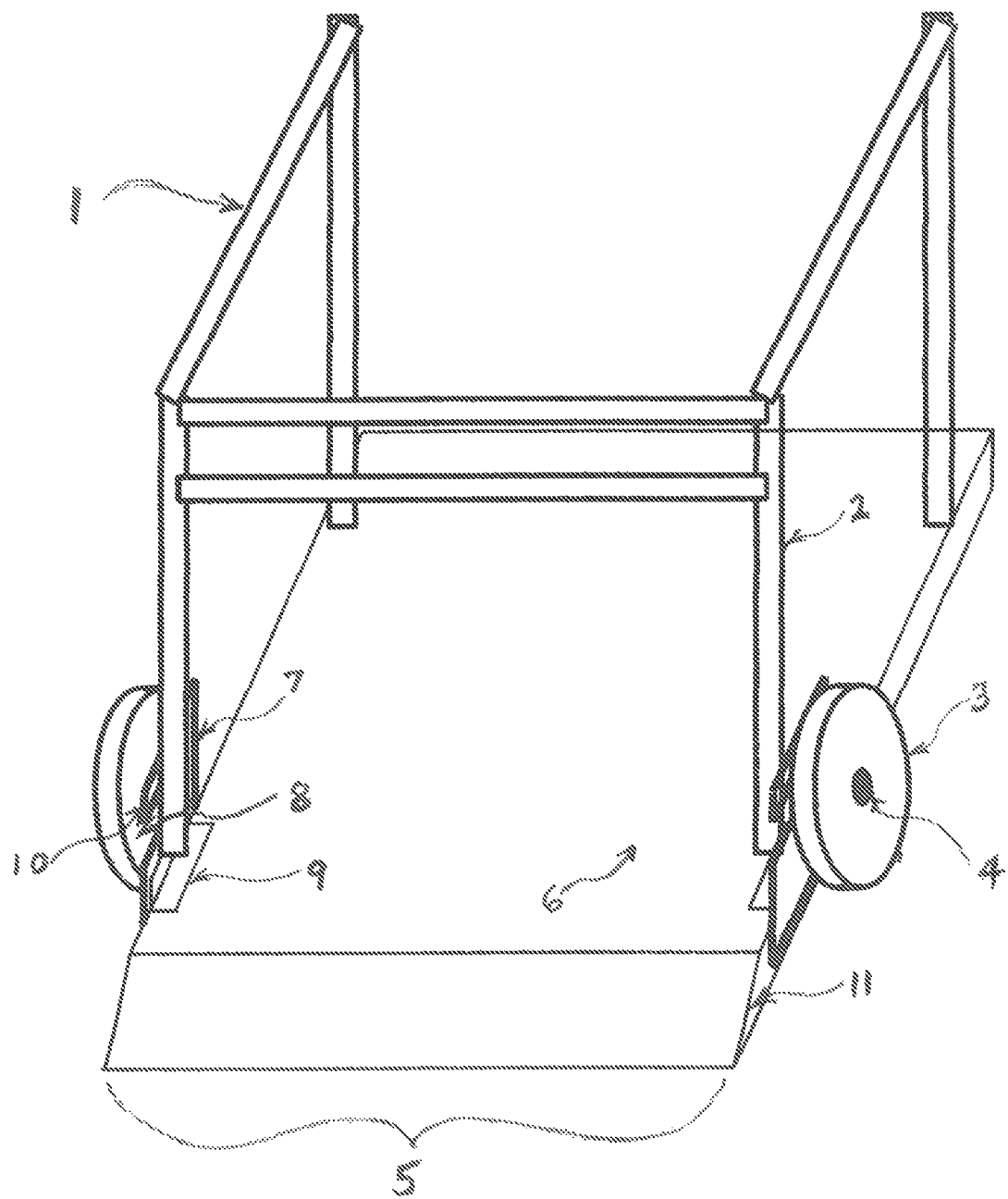
FIG. 1 is an illustration of an isometric view of a medical walker captured and secured on the IMWDS.
Figure 2:
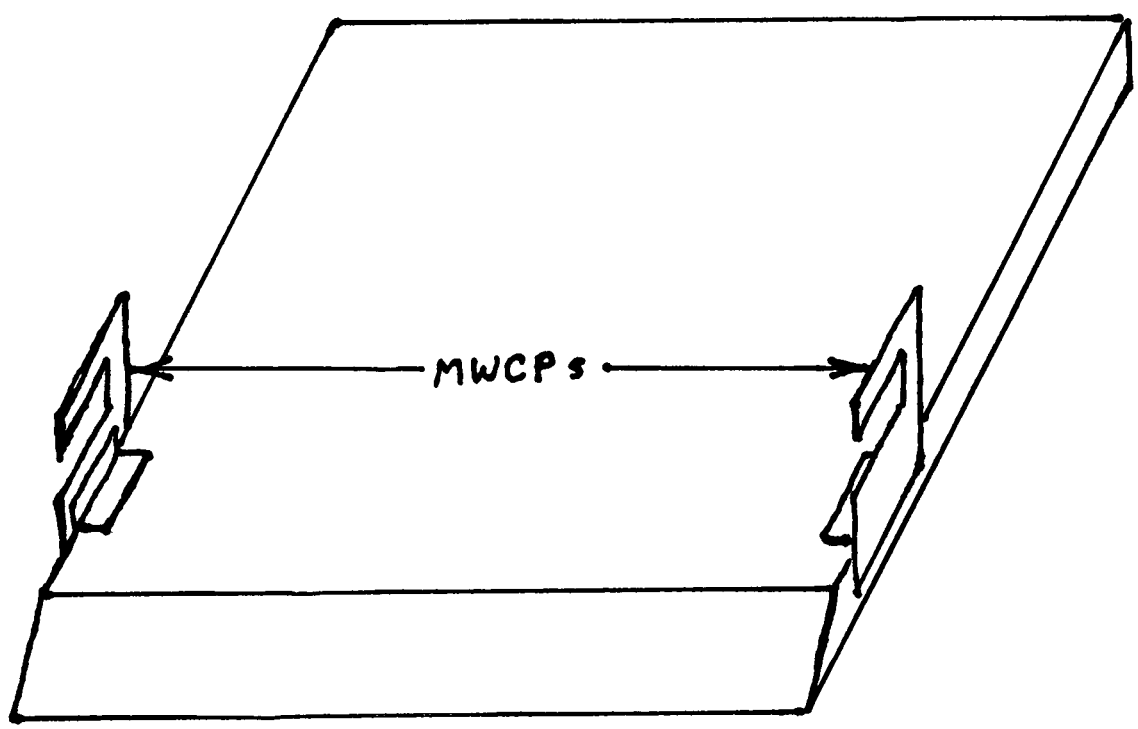
FIG. 2 is an illustration of an isometric view of the IMWDS with its AMRAs in their engaged position.
Figure 3:
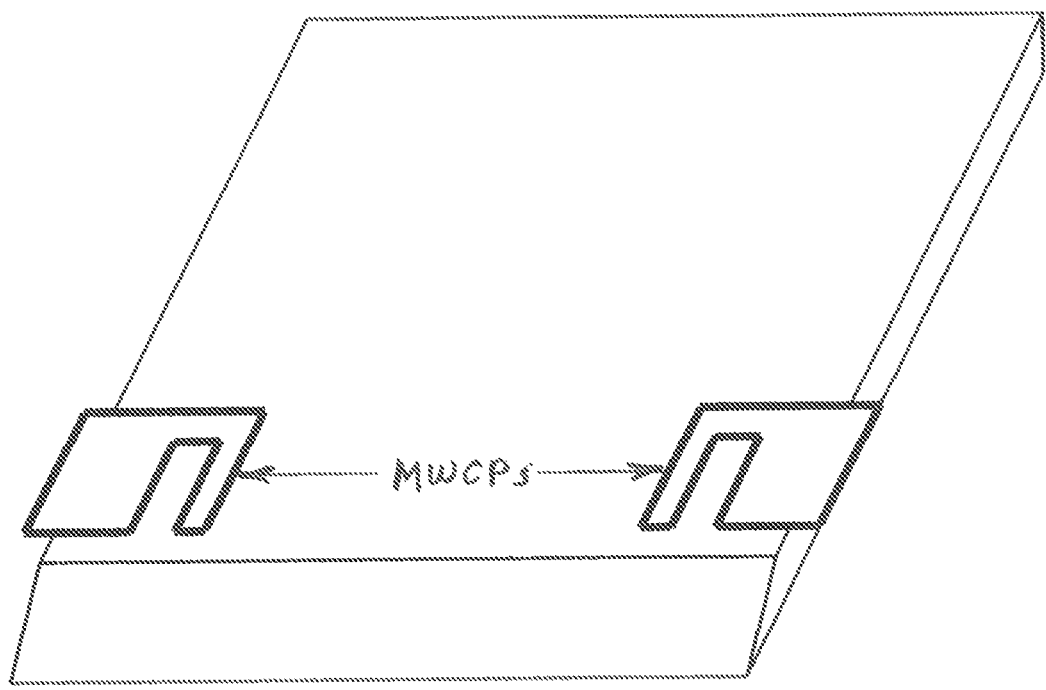
FIG. 3 is an illustration of an isometric view of the IMWDS with its AMRAs in their disengaged position which is also the natural position for the AMRAs.
Figure 4:
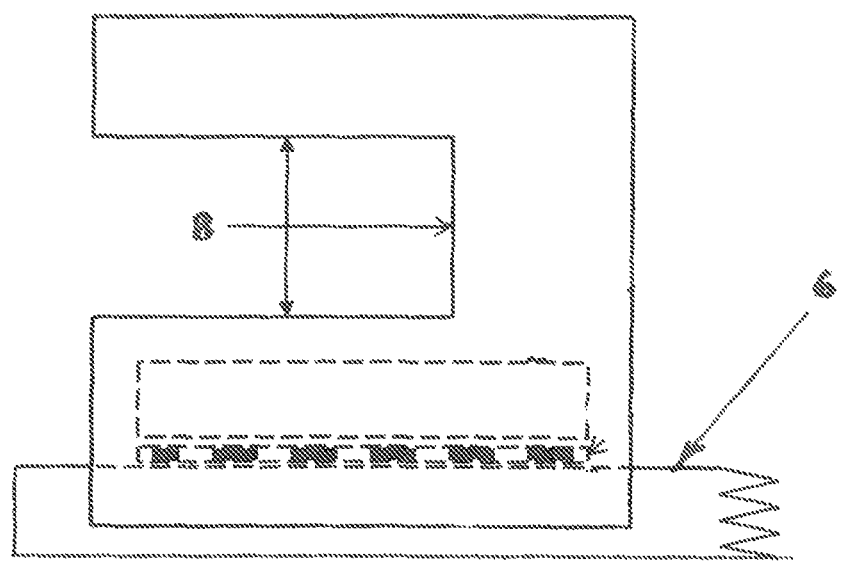
FIG. 4 is an illustration of the side view of an AMRA's medical walker capture plate (MWCP) in its engaged position showing the MWCP's cut out with the MWCP hinged to the IMWDS's platform base.
Figure 5:
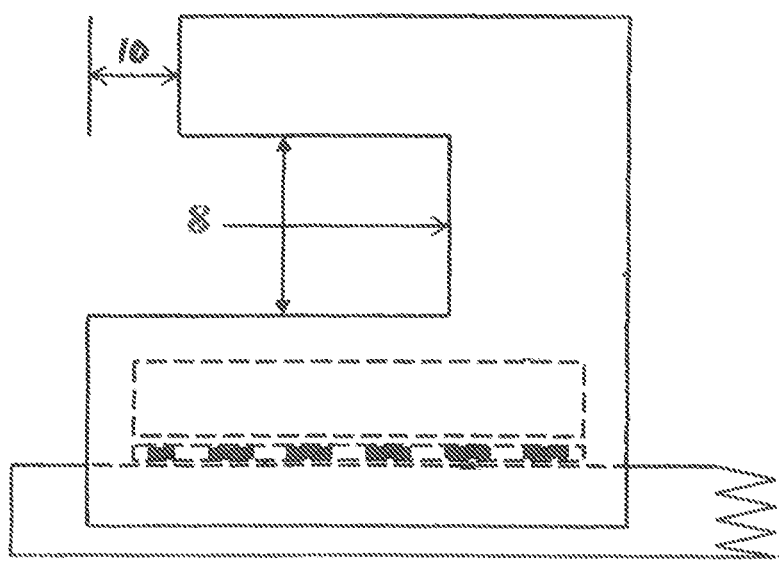
FIG. 5 is an illustration of the side view of an AMRA's MWCP in its engaged position as in FIG. 4 but with the upper portion of the MWCP's cut out set back relative to the lower portion of the MWCP's cut out.

There are three versions of the IMWDS (5) that will be discussed in the following order: the Flexible Flat Spring Striking Plate (FFSSP) based Automatic Movement Restrictor Assembly (AMRA) IMWDS (5) version, the Self-Closing Spring Loaded Hinge (SCSLH) based AMRA IMWDS (5) version and the Coil Spring (CS) based AMRA IMWDS (5) version. All three IMWDSs (5) operate on same basic principle and consist of a main platform base (6) and an AMRA. FIG. 1 is an illustration of an isometric view of a medical walker (1) that is captured/secured on an IMWDS (5) such that the weight of the medical walker user on the IMWDS (5) helps to hold the IMWDS (5) down against the floor/ground and therefore, in turn, the IMWDS (5) helps to hold down the captured/secured medical walker (1) thus helping to prevent the front of the medical walker (1) from unsafety lifting up and rotating backwards as the medical walker user pulls back on the handles of the medical walker (1) as the medical walker user attempts to access the medical walker (1). The medical walker's front leg (2) has a wheel (3) that is attached to the medical walker (1) via an axle (4). The upper surface of the main platform base (6) of the IMWDS (5) has the AMRA attached to it. The AMRA consists generically of a hinge (9) and a flat plate (7) with the flat plate (7) having a cut-out (8). The flat plate (7) with its cut-out (8) is also known as the medical walker capture plate (MWCP). The cut-out (8) is used to almost completely surround the medical walker's axle (4) when the medical walker (1) is being captured/secured by the IMWDS (5). The hinge (9) is used to couple the MWCP to the upper surface of the main platform base (6) and allows the MWCP to rotate/pivot from the upper surface of the main platform base (6) to the near vertical capture position. Each IMWDS's MWCP functions the same in that they capture/secure the medical walker's axle (4) and thus hold the medical walker (1) to the main platform base (6). The difference is in the mechanisms that are used in transitioning the MWCP between the MWCP's upright position and the MWCP's down/horizontal position. Each of these mechanisms will be described in more detail later on. The IMWDS (5) may be placed on the ground or a floor. Additionally, the AMRA mechanism portion of the of the IMWDS (5) may be imbedded in/attached to a floor beside an indentation in the floor to allow the MWCP portion of the AMRA to rotate up to the capture position. FIG. 2 shows the MWCP portion of the AMRA in the upright position relative to the main platform base (6) a position also identified as the captured/secured/engaged position. FIG. 3 shows the IMWDS (5) with just Its AMRSs in the disengaged position which is the natural position for the MWCP in the down or horizontal/parallel position relative to the upper surface of the main platform base (6) of the IMWDS (5). FIG. 4 is an illustration of the side view of the AMRA's MWCP in the MWCP's engaged vertical position showing the MWCP's cut-out (8) with the MWCP hinged to the main platform base (6). FIG. 5 is an illustration of the side view of the AMRA's MWCP In the MWCP's engaged position as in FIG. 4, but with the upper portion of the cut-out (8) set back (10) from the lower portion of the cut-out (8) to insure that the upper portion of the cut-out (8) will not improperly catch on the medical walker's axle (4) before the MWCP has been sufficiently rotated up without interference to the capture position. Although it is possible to construct an IMWDS (5) using only one MWCP, the IMWDS (5) is more effective when both of the medical walker's two front wheel's axles (4) are captured/secured by both MWCPs. The following section describes the operational setup and use of an IMWDS (5) that has a portable main platform base (6) and two AMRAs. The medical walker (1) is the type that has a wheel (3) attached to each of its two front legs (2). An aide or caregiver is expected to perform all tasks associated with getting the IMWDS (5) ready for the user as follows:

1. The aide or caregiver places the IMWDS (5) on the floor or ground in front of the person who will be using the medical walker (1) while the person who will be using the medical walker (1) is sitting. The MWCPs are in the down or horizontal position relative to surface of the main platform base (6) with the open ends of the MWCP's cut-outs (8) facing away from the user.

2. The aide or caregiver places the medical walker (1) in front of the main platform base (6) of the IMWDS (5) such that each of the medical walker's front wheels (3) is positioned in front of each of the MWCP's cut-outs (8), 3. The aide or caregiver then pushes the medical walker (1) backwards towards the medical walker user until the medical walker's front wheels (3) make contact with the lower portion of the MWCP not containing the cut-out (8). Once the medical walker's front wheels (3) make contact with and push down on the lower portion of the MWCP the upper cut-out (8) portion of the MWCP will begin to rotate upwards and the wheel's axles (4) will then become firmly seated within the cut-outs (8) of each of the MWCPs.

4. The user of the medical walker (1) then places his or her feet on the main platform base (6) grips the handles of the medical walker (1) and pulls himself or herself up. If necessary, the aide or caregiver can step on the front of the main platform base (6) as the medical walker user pulls himself or herself up onto the medical walker (1).

5. Once the foregoing is accomplished the medical walker user can shift from standing on the main platform base (6) to moving forward with the medical walker (1) and as the medical walker's front legs (2) and wheels (3) leave the MWCPs the MWCPs rotate down and end up in the horizontal position relative to the upper surface of the main platform base (6). The user is then able to go in any direction he or she desires.

Figure 6:
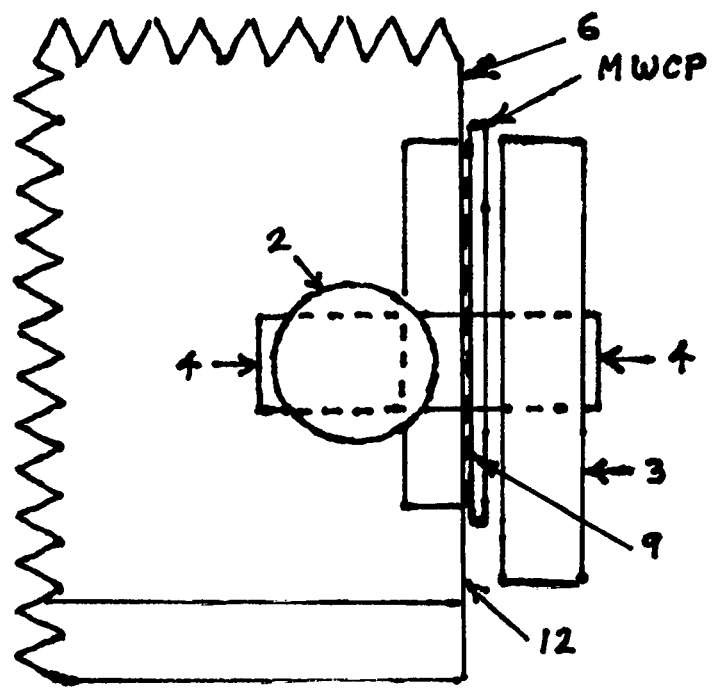
FIG. 6 is an illustration of the top view of the flexible flat spring striking plate based version of the AMRA's MWCP in its engaged position with the medical walker's front wheel's axle captured.
Figure 7:
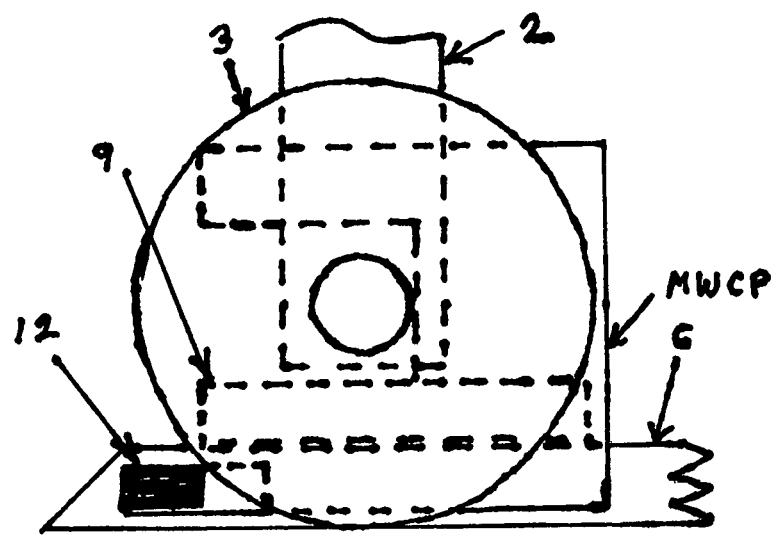
FIG. 7 is an illustration of the side view of the flexible flat spring striking plate based version of the AMRA's MWCP in its engaged position with the medical walker's front wheel's axle captured.
Figure 8:
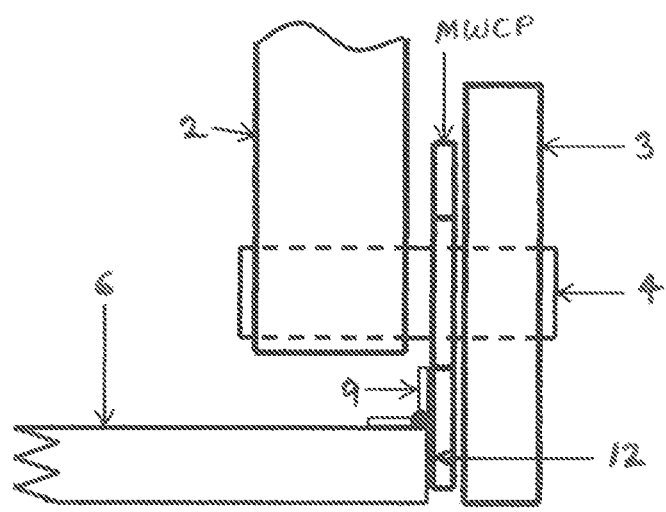
FIG. 8 is an illustration of the front view of the flexible flat spring striking plate based version of the AMRA's MWCP in its engaged position with the medical walker's front wheel's axle captured.
Figure 9:
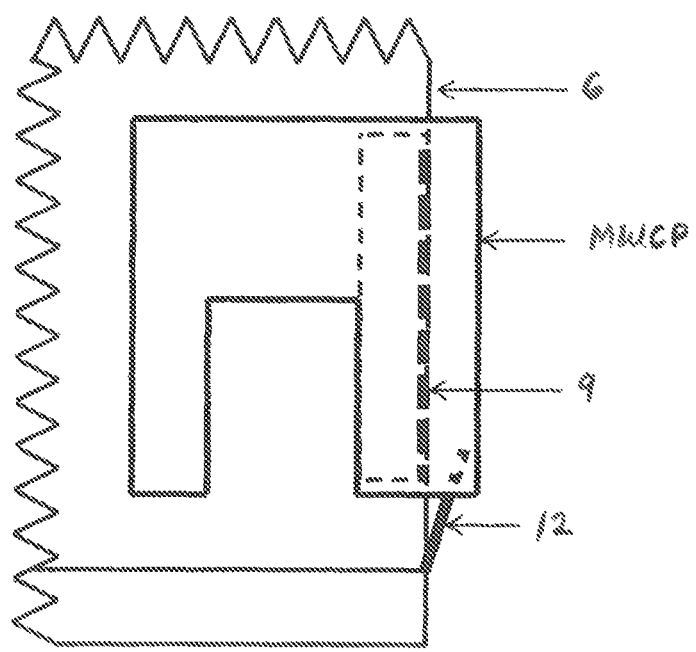
FIG. 9 is an illustration of the top view of the flexible flat spring striking plate based version of the AMRA's MWCP in its disengaged position.
Figure 10:
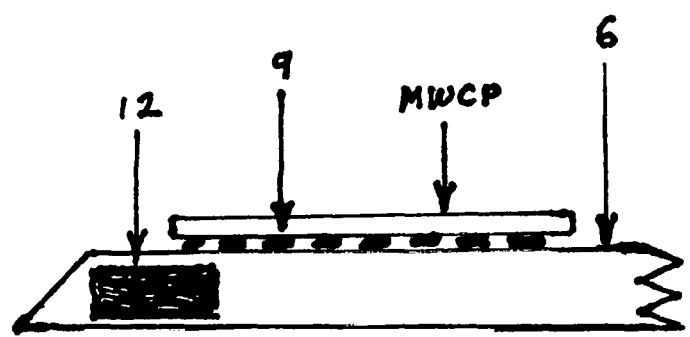
FIG. 10 is an illustration of the side view of the flexible flat spring striking plate based version of the AMRA's MWCP in its disengaged position.
Figure 11:
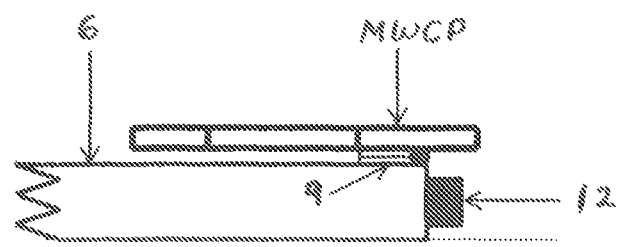
FIG. 11 is an illustration of the front view of the flexible flat spring striking plate based version of the AMRA's MWCP in its disengaged position.
Figure 12:
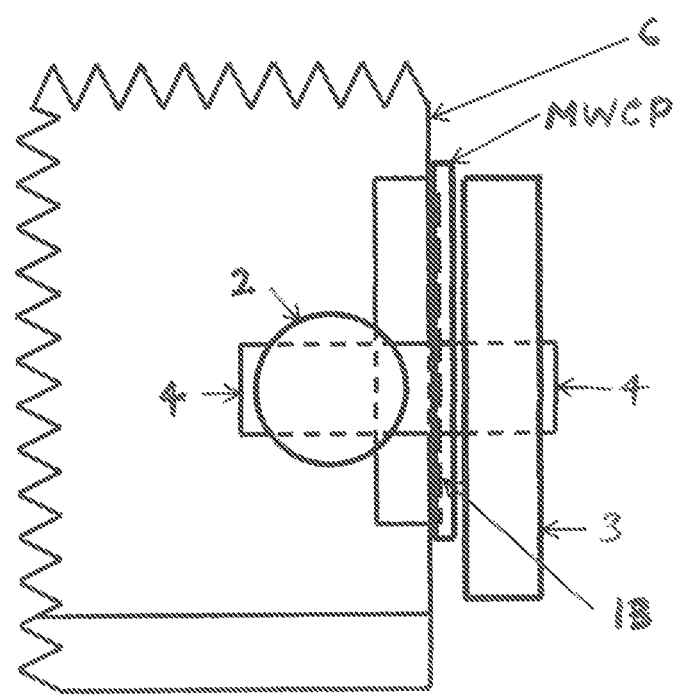
FIG. 12 is an illustration of the top view of the self-closing spring-loaded hinge based version of the AMRA's MWCP in its engaged position with the medical walker's front wheel's axle captured.
Figure 13:
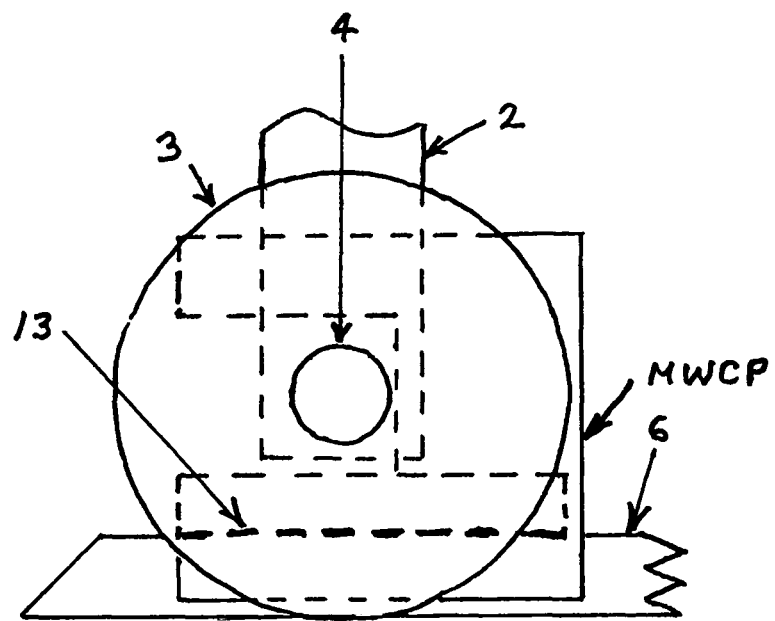
FIG. 13 is an illustration of the side view of the self-closing spring-loaded hinge based version of the AMRA's MWCP in its engaged position with the medical walker's front wheel's axle captured.
Figure 14:
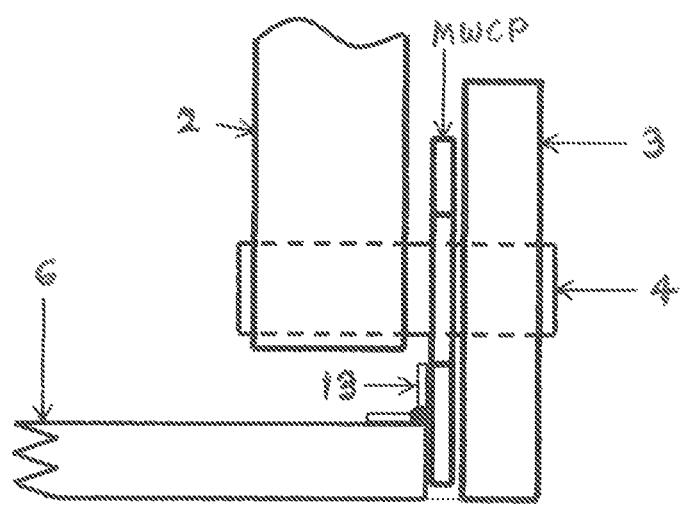
FIG. 14 is an illustration of the front view of the self-closing spring-loaded hinge based version of the AMRA's MWCP in its engaged position with the medical walker's front wheel's axle captured.
Figure 15:
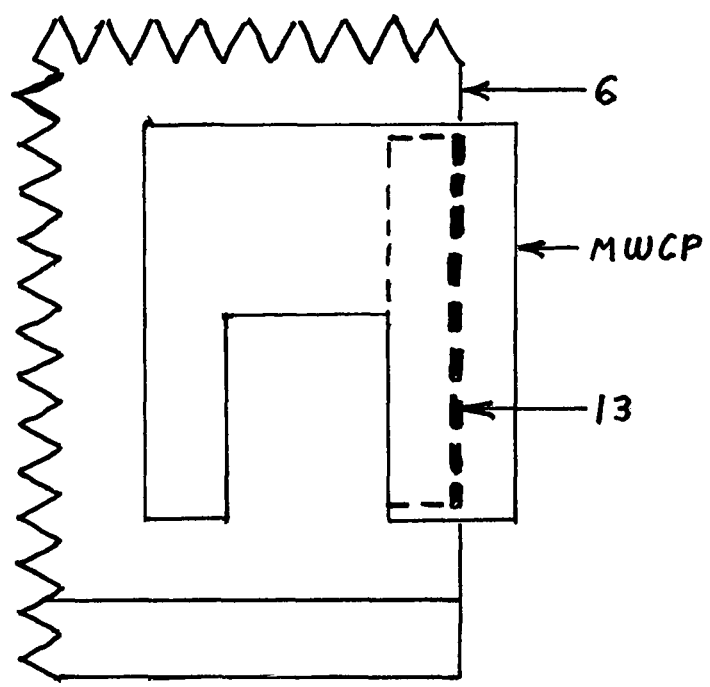
FIG. 15 is an illustration of the top view of the self-closing spring-loaded hinge based version of the AMRA's MWCP in its disengaged position.
Figure 16:
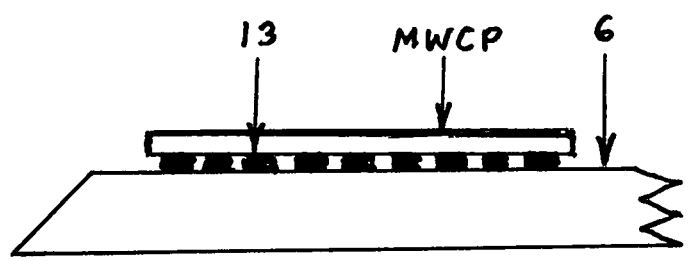
FIG. 16 is an illustration of the side view of the self-closing spring-loaded hinge based version of the AMRA's MWCP in its disengaged position.
Figure 17:
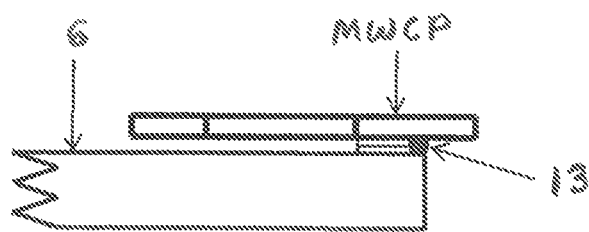
FIG. 17 is an illustration of the side view of the self-closing spring-loaded hinge based version of the AMRA's MWCP in its disengaged position.
Figure 18:
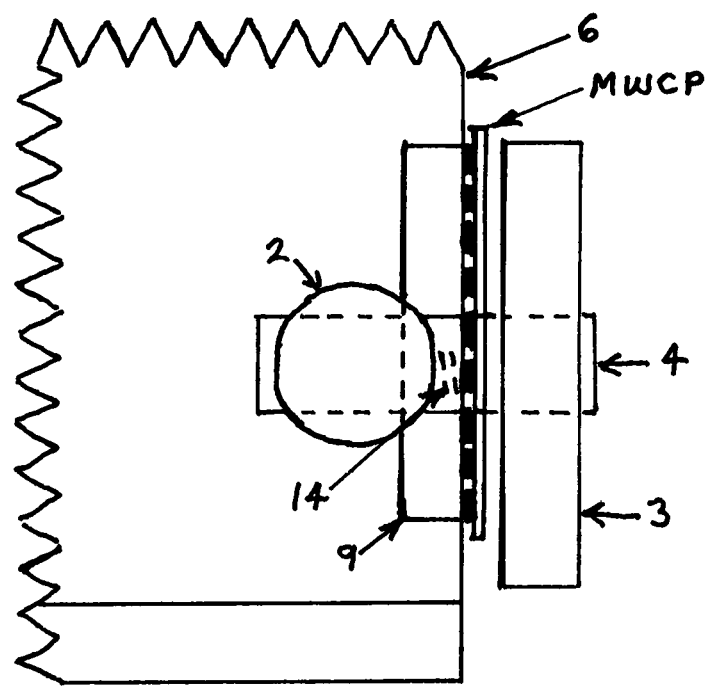
FIG. 18 is an illustration of the top view of the coil spring based version of the AMRA's MWCP in its engaged position with the medical walker's front wheel's axle captured.
Figure 19:
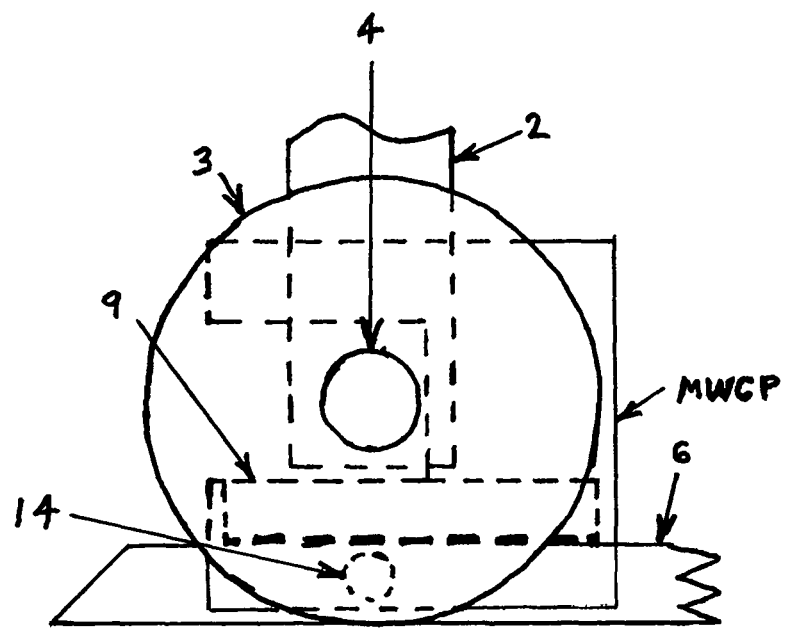
FIG. 19 is an illustration of the side view of the coil spring based version of the AMRA's MWCP in its engaged position with the medical walker's front wheel's axle captured.
Figure 20:
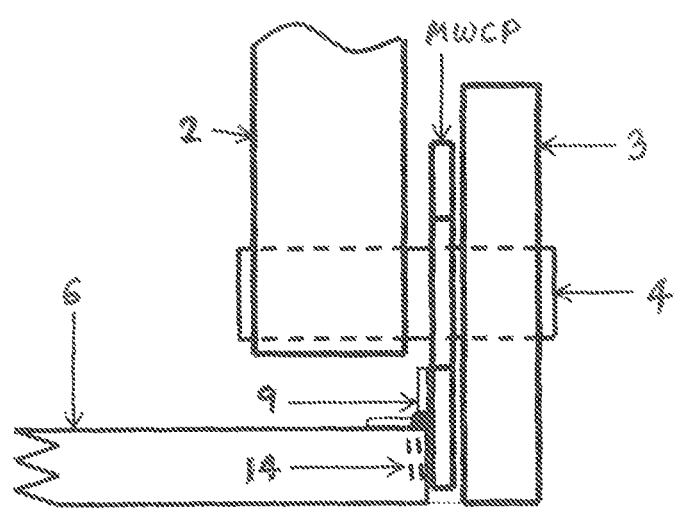
FIG. 20 is an illustration of the front view of the coil spring based version of the AMRA's MWCP In its engaged position with the medical walker's front wheel's axle captured.
Figure 21:
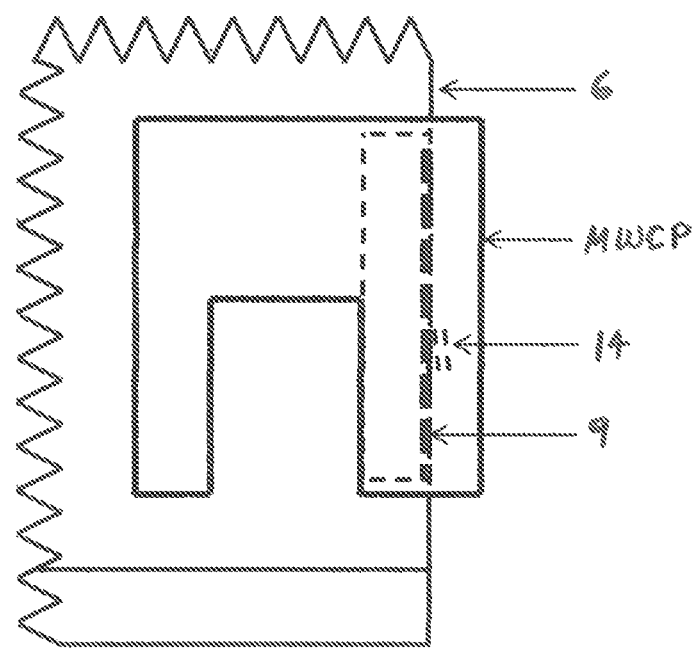
FIG. 21 is an illustration of the top view of the coil spring based version of the AMRA's MWCP in its disengaged position.
Figure 22:
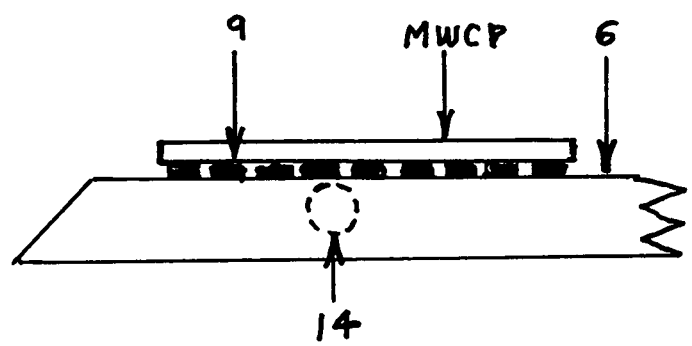
FIG. 22 is an illustration of the side view of the coil spring based version of the AMRA's MWCP in its disengaged position.
Figure 23:
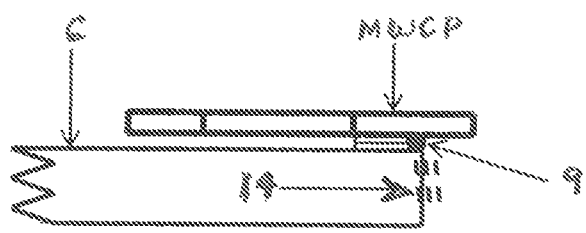
FIG. 23 is an illustration of the front view of the coil spring based version of the AMRA's MWCP in its disengaged position.
Figure 24:
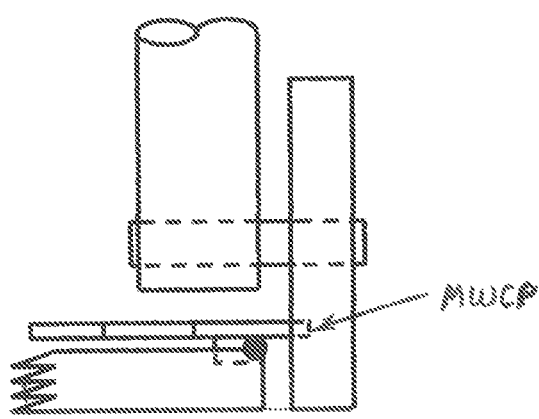
FIGS. 24 through 29 show the progression of the successive stages of the installation of the medical walker on the IMWDS from its initial uninstalled disengaged positioning to its fully engaged installed position as follows.
Figure 25:
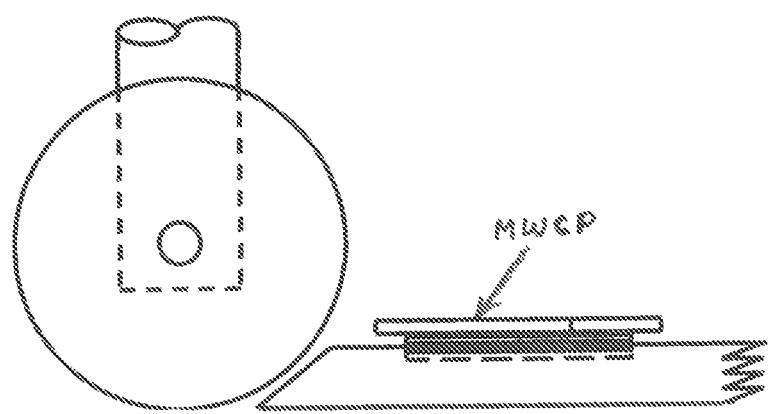
Figure 26:
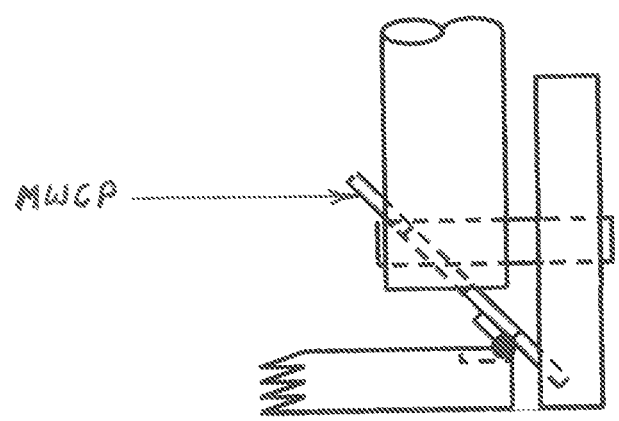
Figure 27:
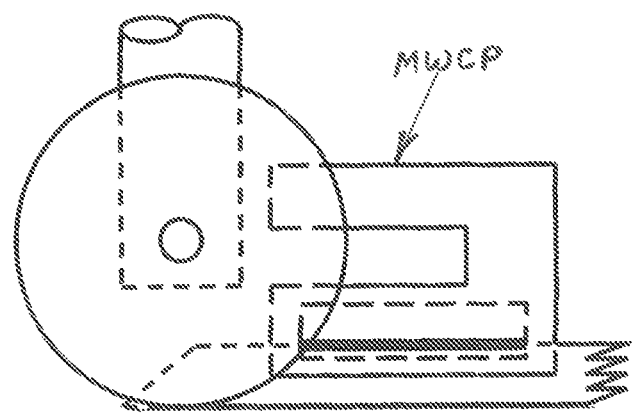
Figure 28:
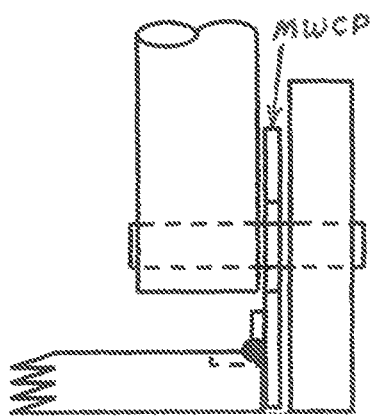
Figure 29:
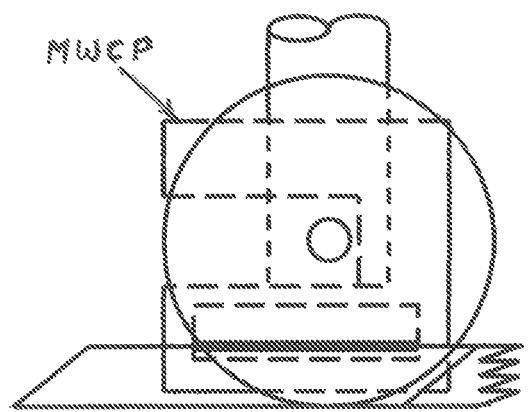
Figure 30:
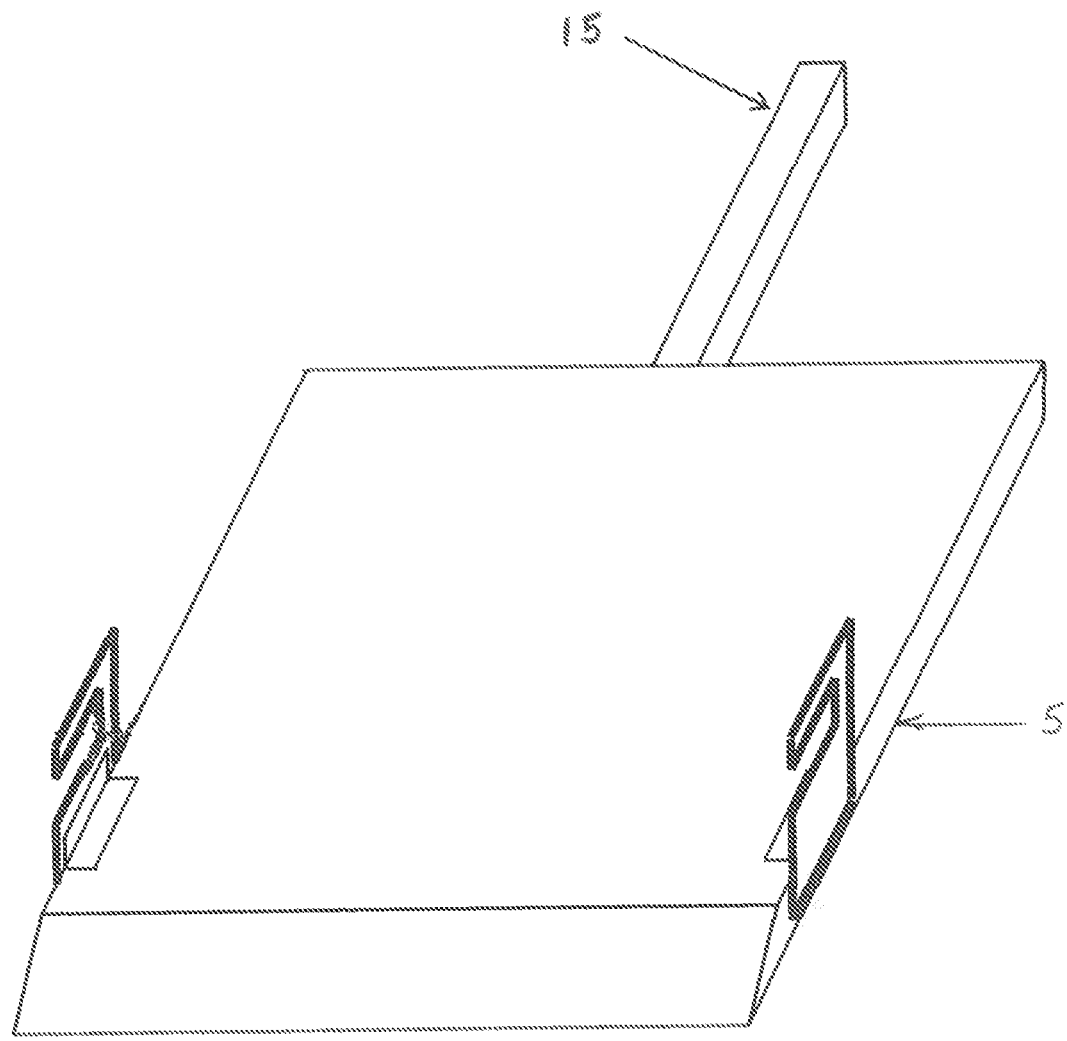
FIG. 30 is an illustration of an isometric view of the IMWDS with its AMRA's MWCPs in their engaged position and also with its rotatable extension arm/bar/rod (REABR) in its fully/maximum engaged position.
Figure 31:
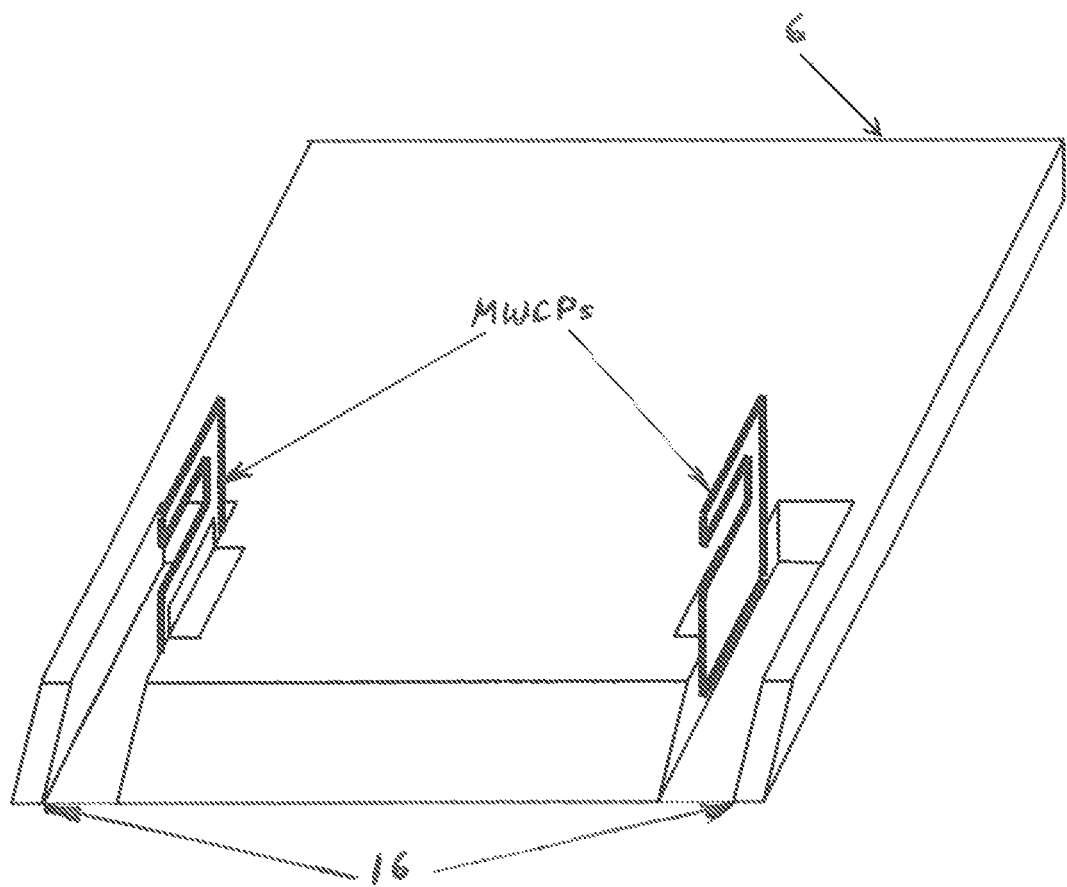
FIG. 31 is an illustration of an isometric view of the IMWDS with its AMRA's MWCPs in their engaged position and also with platform base side arms.
Figure 32:
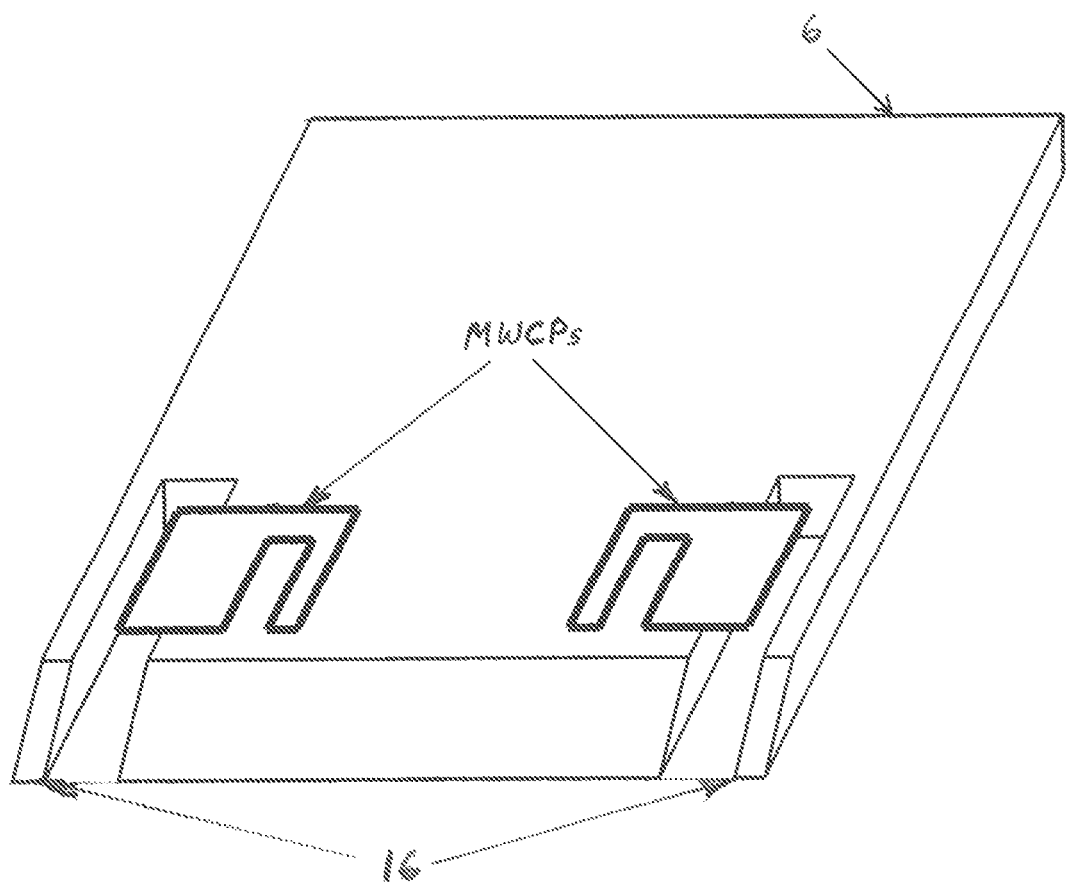
FIG. 32 is an illustration of an isometric view of the IMWDS with its AMRA's MWCPs in their disengaged position and also with platform base side arms.
Figure 33:
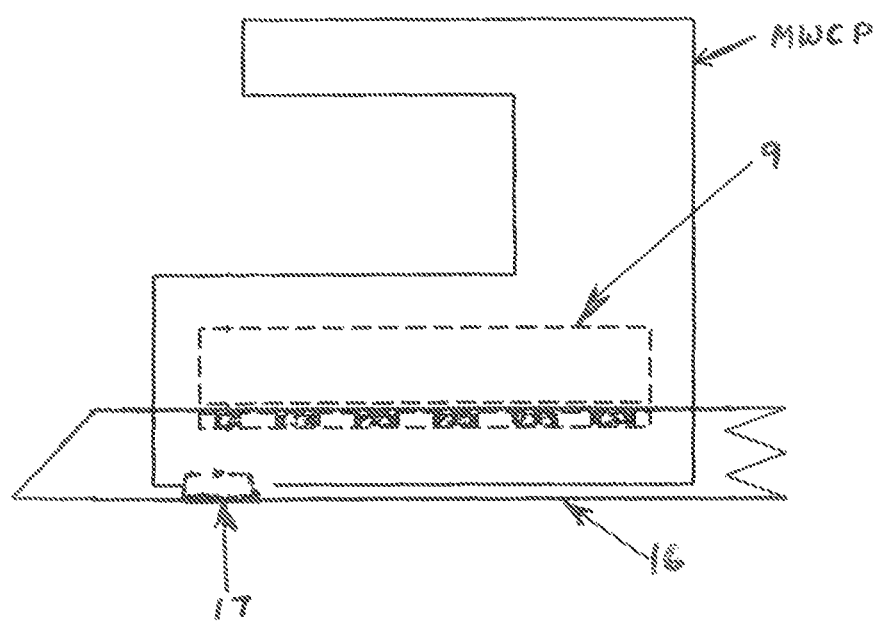
FIG. 33 is an illustration of a side view of a wheel ramp attached to the IMWDS with the AMRA's MWCP in the engaged position such that the purpose of the wheel ramp is to help prevent the medical walker from rolling forward without intention.
Figure 34:
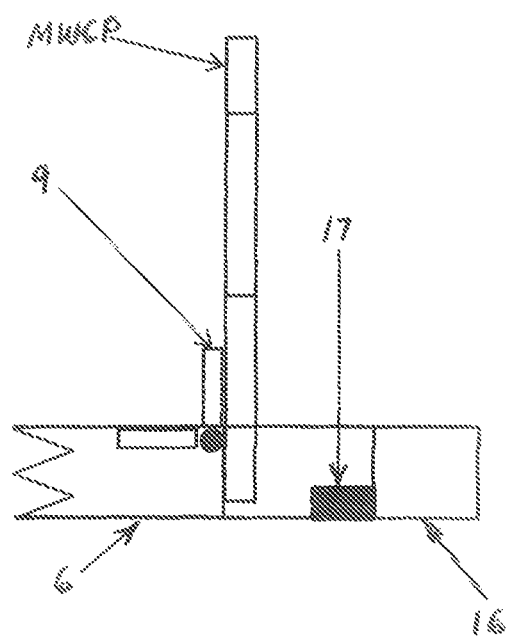
FIG. 34 is an illustration of a front view of a wheel ramp attached to the IMWDS with the AMRA's MWCP in the engaged position.
Figure 35:
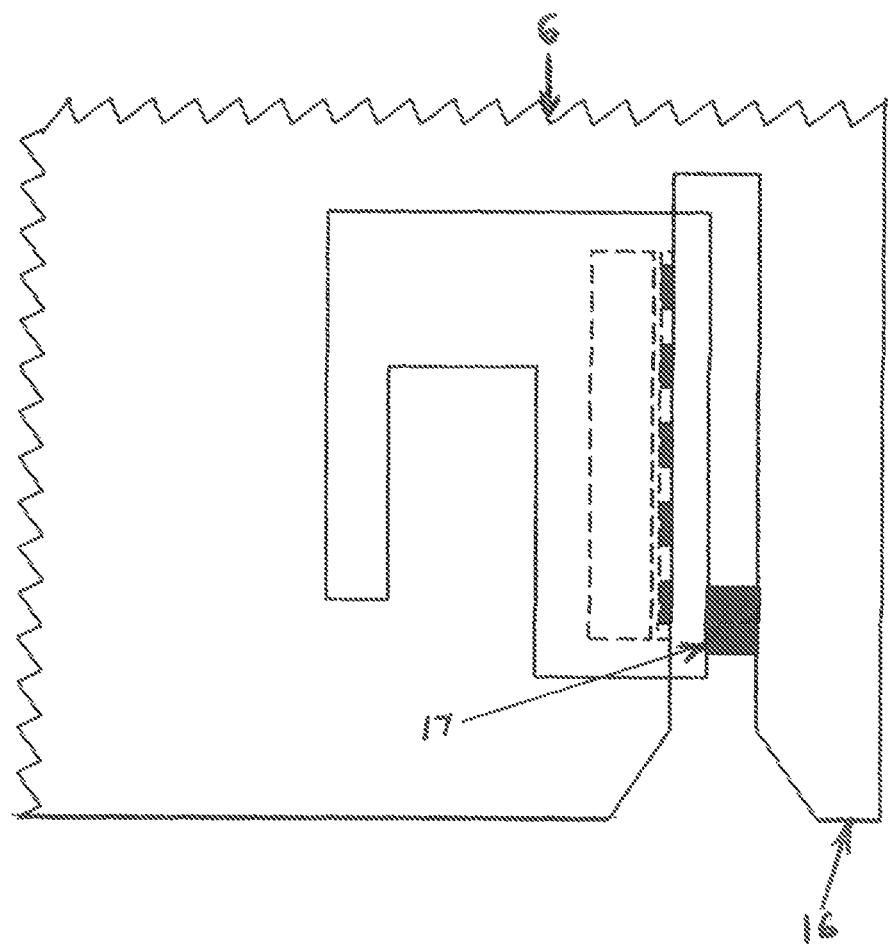
FIG. 35 is an illustration of a top view of a wheel ramp attached to the IMWDS with the AMRA's MWCP in the engaged position.
Figure 36:
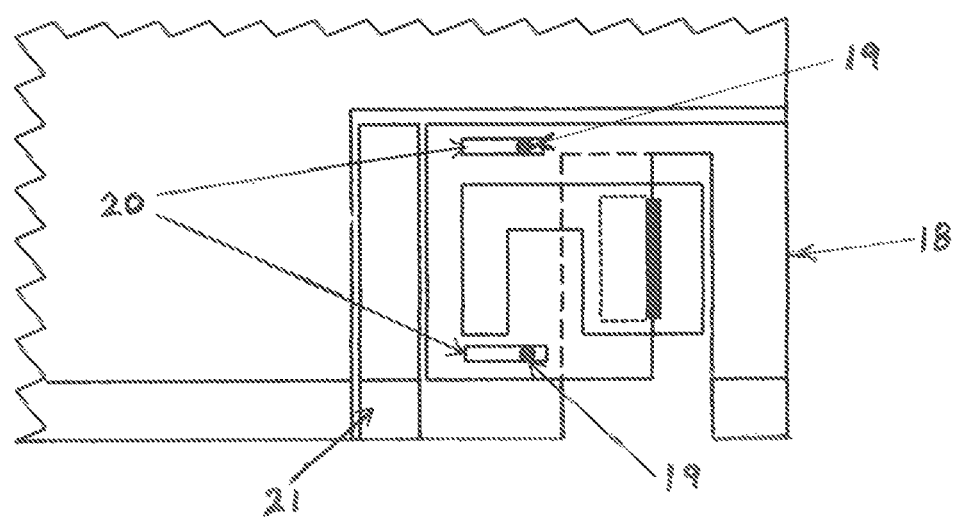
FIG. 36 is an illustration of a top view of slots in the movable AMRA of the IMWDS with the purpose of allowing for the adjustment of the spacing between the two AMRAs on each IMWDS via connecting fasteners which are not shown.
Figure 37:
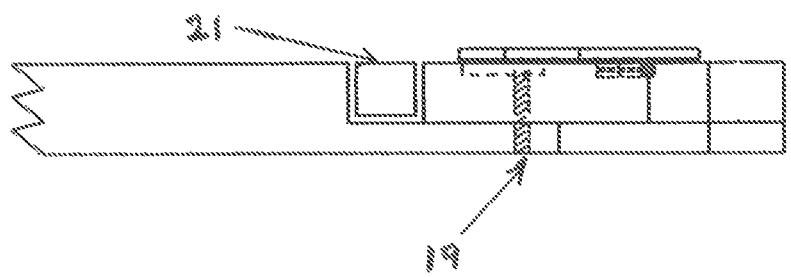
FIG. 37 is an illustration of a front view of slots in the movable AMRA of the IMWDS as well as the fixed mounting holes in the platform base of the IMWDS.

Although it is desirable for the MWCP to lie between the medical walker's front leg (2) and front wheel (3) the IMWDS (5) can be designed to capture the end of the front axle (4) or an extending rod that is attached to each of the front legs (2) of a medical walker (1) without front wheels (3), however, the medical walker (1) is more secured when the MWCP is positioned to lie between the medical walker's front legs (2) and front wheels (3). The details of the three versions of the IMWDS (5) are as follows: 1. The FFSSP based version of the IMWDS (5) which is shown in FIGS. 6 through 11 will be discussed as follows: FIGS. 6 through 8 show the FFSSP based version in the engaged position and FIGS. 9 through 11 show the FFSSP based version in the disengaged position. More specifically, FIGS. 6 through 8 show the medical walker's captured front axle (4), its associated front wheel (3) and a portion of its front leg (2). Additionally shown in FIGS. 6 through 8 are the following: the IMWDS's main platform base (6) the AMRA with its MWCP with its flat plate (7) cut-out (8) and hinge (9) such that the lower non cut-out portion of the flat plate (7) attached to the hinge (9) always hangs over the side of the main platform base (6) when the lower non cut-out portion of the flat plate (7) is in the horizontal position in turn such that to the extent that as the backward moving medical walker's front wheel (3) interacts with and pushes down on/depresses the lower non cut-out portion of the flat plate (7) the upper cut-out (8) portion of the flat plate (7) via its hinge (9) attachment to the main platform base (6) is rotated upwards towards the vertical position which, of course is the proper position via the cut-out (8) to capture/secure the medical walker's axle (4) in all directions except the forward direction in turn via the MWCP getting sandwiched between the medical walker's front wheel (3) and the medical walker's front leg (2). The foregoing is allowed to happen in concert with the following: Attached at the point where the front tapered surface (11) meets the horizontal upper surface of the main platform base (6) is one end of a flexible flat spring striking plate (12) lying in a vertical plane perpendicular to the horizontal plane of the upper surface of the main platform base (6) while the other end of the flexible flat spring striking plate (12) is located at a distance away from the side of the main platform base (6) that is equal to the combined thicknesses of the lower non cut-out portion of the flat plate (7) and the flexible flat spring striking plate (12) such that flexible flat spring striking plate (12) is also positioned just under the front end of the lower non cut-out portion of the flat plate (7) lying in the horizontal plane thus preventing the lower non cut-out portion of the flat plate (7) from moving downward until the backward movement of the medical walker's front wheel (3) displaces the flexible flat spring striking plate (12) sideways out of the way of the lower non cut out portion of the flat plate (7) so that the medical walker's front wheel (3) can, as previously stated, also move down/depress the lower non cut-out portion of the flat plate (7) and in turn cause the upper cut-out (8) portion to be placed in the proper vertical position to capture/secure the medical walker's axle (4) and thus the medical walker (1). The foregoing sidewise shifting of both flexible flat spring striking plates (12) towards each other as well as towards either side of the main platform base (6) is accomplished because the inner distance spread of the inside of medical walker's two front wheels (3) matched the combined width of the main platform base (6) plus two times the thickness of the flexible flat spring striking plate (12) plus two times the thickness of the lower non cut-out portion of the flat plate (7) thus causing/forcing both flexible flat spring striking plates (12) to be constrained against either side of the main platform base (6) and out of the way of the backwards movement of the medical walker's front wheels (3) and thus the axles (4) into the capturing cut-outs (8). Conversely, as the medical walker (1) leaves the IMWDS (5) the sidewise outward spring action of the flexible flat spring striking plates (12) no longer being constrained by the insides of the medical walker's front wheels (3) push outwards on the lower non cutout portion of the flat plates (7) causing the upper cut-out (8) portion of the flat plates (7) to rotate downward to lie flat on or flush with the upper surface of the main platform base (6) placing the flat plates (7) in disengaged position. 2. The SCSLH based version of the 1MWDS's MWCP itself operates in the same manner as that of the FFSSP based version of the IMWDS (5), however, the engaging and disengaging process of the MWCP of the SCSLH. based version of the 1MWDS (5), in contrast employs a self-closing spring loaded hinge (13) to return the MWCP from the engaged position to the disengaged position when the medical walker's front legs (2) and wheels (3) exit the IMWDS (5) and the medical walker's legs (2) no longer constrain the MWCP from rotating downward. The start off engaged position of the SCSHL based version of the IMWDS's MWCP is shown in FIGS. 12 through 14 while the disengaged position of the SCSLH based version of the IMWDS's MWCP is shown in FIGS. 15 through 17. In other words, in the case of the SCSLH based version of the IMWDS (5), the self-closing spring loaded hinge (13) is normally in the closed position when the IMWDS (5) is in the disengaged position unless there are forces trying to keep the self-closing spring loaded hinge (13) in the open position. When the self-closing spring loaded hinge's MWCP is in the upright/vertical position between the medical walker's front leg (2) and front wheel (3) the self-closing spring loaded hinge (13) pulls on the MWCP's upper cut-out (8) portion against the medical walker's front leg (2). The medical walker's front leg (2) prevents the MWCP's upper cutout (8) portion from rotating/pivoting down and closing against the upper surface of the main platform base (6). More specifically, when the medical walker's front leg (2) and wheel (3) leaves the MWCP the self-closing spring loaded hinge (13) is free to close in turn causing the attached MWCP's upper portion with the cutout (8) to transition from an upright/vertical engaged position to a down disengaged position onto the upper surface of the main platform base (6). 3. The CS based version of the IMWDS's MWCP itself operates in the same manner as that of the FFSSP based version of the IMWDS (5), however, for the engaging and disengaging process of the MWCP the CS based version of the IMWDS (5) employs a coil spring (14) to return the MWCP from the engaged position to the disengaged position when the medical walker's front leg (2) and wheel (3) exit the IMWDS (5) and the MWCP is no longer constrained from rotating downward by the medical walker's front leg (2). The engaged position of the MWCP of the CS based version of the IMWDS (5) is shown in FIGS. 18 through 20 while the disengaged position of the MWCP of the CS based version of the IMWDS (5) is shown in FIGS. 21 through 23. In other words, relative to the CS based version of the IMWDS (5) the coil spring (14) is normally fully expanded when the IMWDS's MWCP is in the disengaged position laying on or flush with the upper surface of the main platform base (6). Conversely, when the MWCP of the CS based version of the IMWDS (5) is in the upright/vertical engaged position the MWCP is at the same time located between the medical walker's front leg (2) and the medical walker's front wheel (3) with the coil spring pushing on the lower non cut-out portion of the MWCP which in turn causes the upper cutout (8) portion of the MWCP to push against the medical walker's front leg (2) which prevents the upper cut-out (8) portion of the MWCP from rotating/ pivoting down and closing against or flush with the upper surface of the main platform base (6) until the medical walker's front leg (2) leaves the MWCP thus allowing the coil spring to push the lower non cutout portion of the MWCP to the horizontal position causing the upper cutout (8) portion of the MWCP to transition from the engaged position to the disengaged position onto or flush with the upper surface of the main platform base (6). Without specifically addressing the FFSSP, the SCSLH or the CS based versions of the IMWDS (5) FIGS. 24 through 29 generically show the successive stages/progression of the medical walker accessing the IMWDS (5) especially in terms of the changing positions of the MWCP. FIG. 30 is an illustration of the Rotatable Extension Arm/Bar/Rod (REABR) (15) which adds additional stabilization for the medical walker (1). More specifically, FIG. 30 is an illustration of an isometric view of the IMWDS (5) as well as the REABR (15) fully pivoted to its fully activated position which is perpendicular to the back side of the IMWDS (5). The REABR (15) is attached to the back side of the IMWDS (5) so that the REABR (15) can pivot away from the back side of the IMWDS (5) to a location further rearward where the non-attached end of the REABR (15) is at the furthest distance from the backside of the IMWDS (5) and perpendicular to the back side of the IMWDS (5). When the REABR (15) is fully extended perpendicular to the back side of the IMWDS (5) the REABR (15) increases the downward torque against the front of the IMWDS (5) as a result of the weight of the medical walker user on the IMWDS (5) because the original rear pivot point of the IMWDS (5) itself now becomes effectively shifted/displaced backward from where the walker user's weight is applied thus increasing the resulting downward torque applied to the IMWDS (5) in turn as a result of the increased distance from the pivot point that the weight force is applied as the medical walker user accesses the medical walker (1) and pulls back on the medical walker (1). The operation of the REABR (15) is as follows: Starting with the REABR (15) in the non activated position residing against and parallel to the back side of the IMWDS (5) a person only needs to simply rotate/pivot the REABR (15) oriented to a position perpendicular to the back side of the IMWDS (5) for the REABR to be in the fully activated/operational position providing additional resistance to any unsafe up ending/upward and backward rotational movement of the front of the IMWDS (5) as the medical walker user attempts to access the medical walker (1). FIGS. 31 and 32 respectively are illustrations of isometric views of the IMWDSs (5) with their MWCPs in their engaged and disengaged positions both with the main platform bases (6) having side arms (16) used to guide the movement of the medical walker's front wheels (3) into the IMWDS (5) as the medical walker (1) accesses the IMWDS (5). FIGS. 33,34 and 35 are illustrations of the side, front and top views respectively of the IMWDS (5) with a wheel ramp (17) located between the body of the main platform base (6) and the side arm (16) and positioned to also be located on the floor/ground on which the center of the main platform base (6) also rests to help to prevent the medical walker's front wheels (3) from rolling forward non intentionally. FIGS. 36 and 37 are illustrations of the top and side views respectively of the IMWDS's MWCP in the disengaged position mounted on version A of the Adjustable Positioning Panel (APP) (18) which is separate from the main platform base (6) such that the main platform base (6) has mounting holes (19) and version A of the APP (18) has slots (20) whereby threaded fasteners can pass through both the mounting holes (19) in the main platform base (6) and the slots in version A of the APP (18) such that the threaded fasteners can be tightened with the separate version A of the APP (18) at variable positions relative to and locked with the main platform base (6) in order for the IMWDS (5) to accept the medical walker's two front wheels (3) with various sized medical walkers (1).

Figure 38:
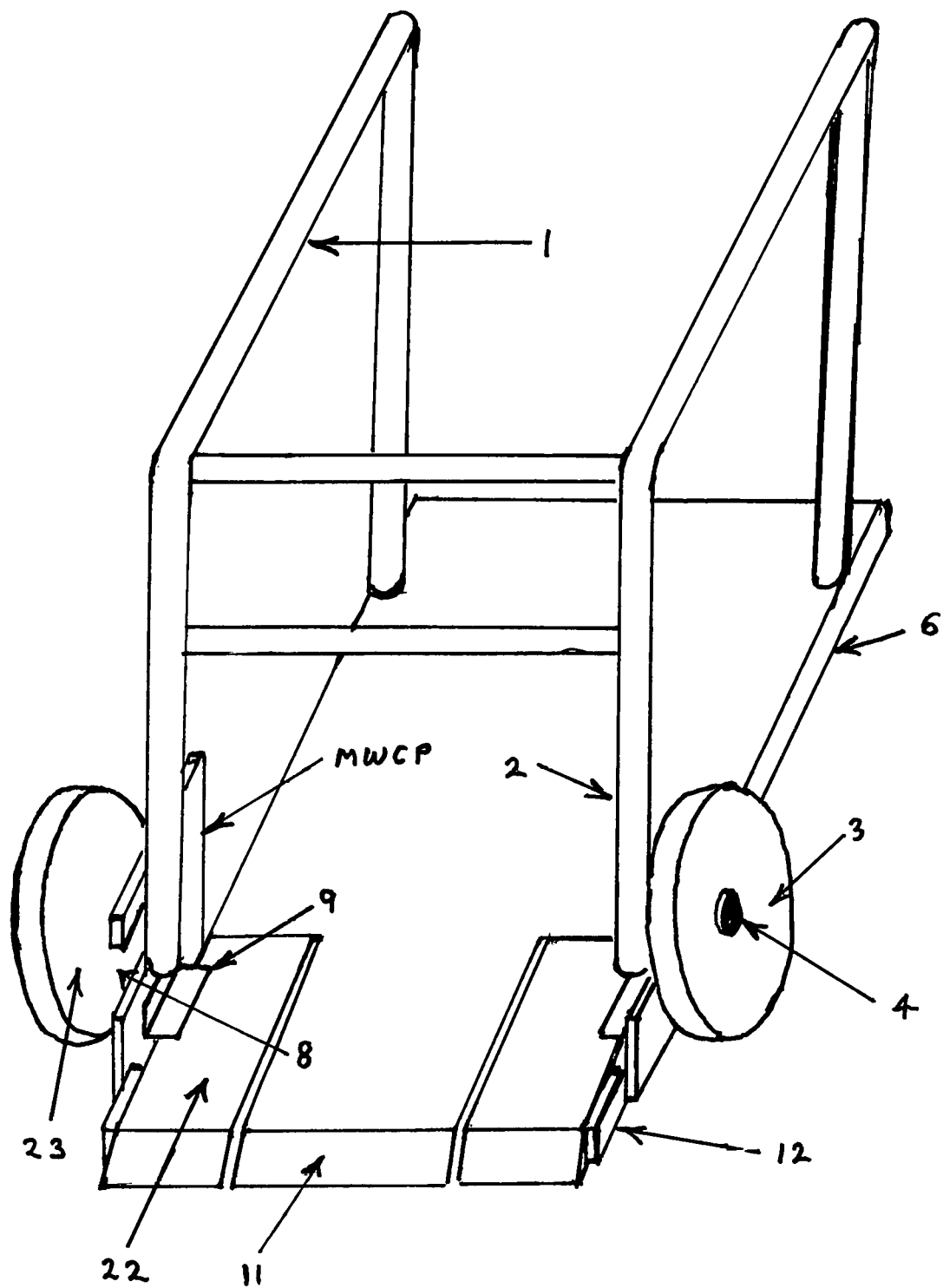
FIG. 38 is an illustration of an isometric view of a medical walker captured and secured on the version of the IMWDS which contains the adjustable positioning panel (APP) which allows for the variable distance spread of the medical walker's front wheels and the associated legs and axles.
Figure 39:
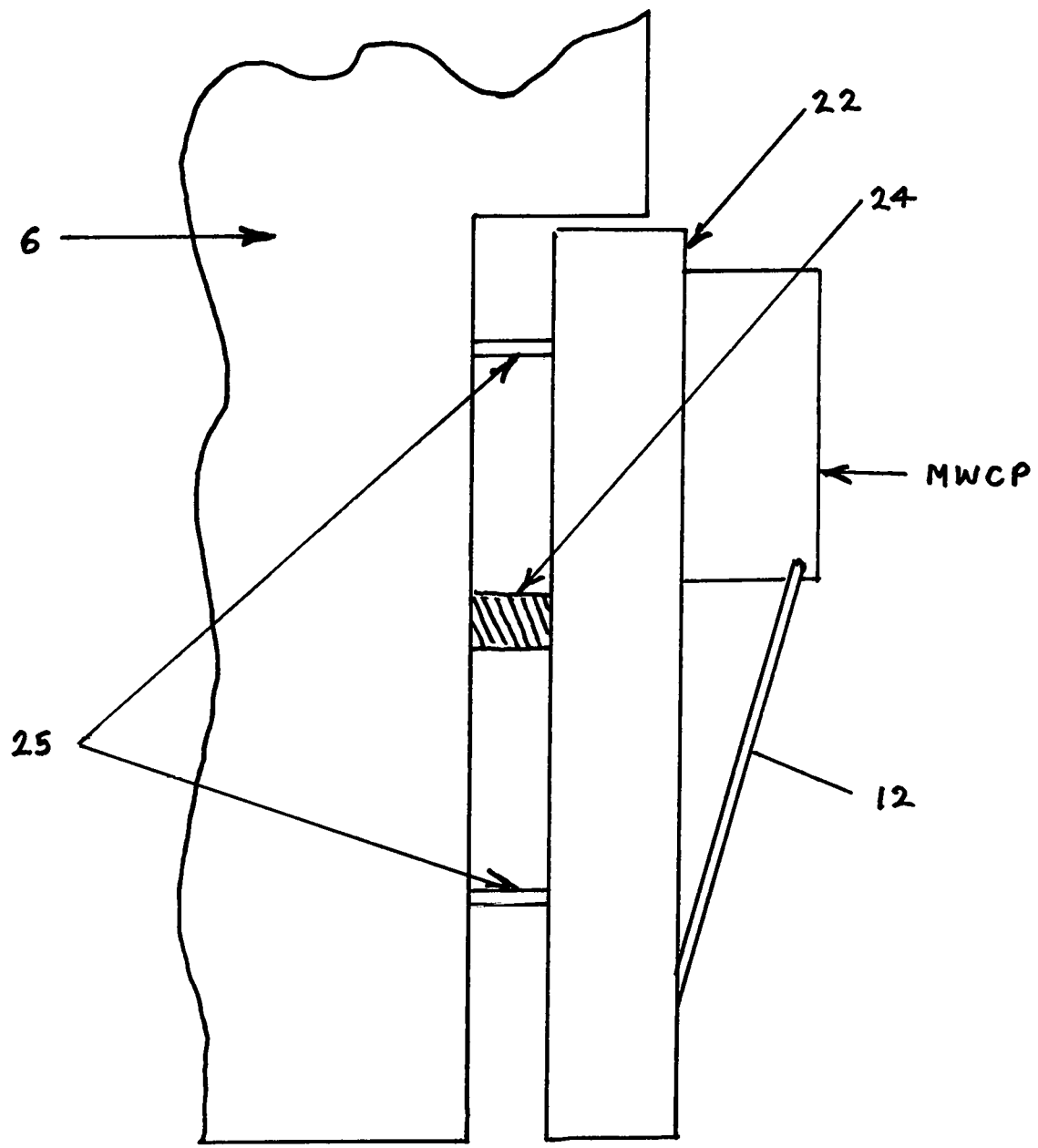
FIG. 39 is an illustration of the underside of only the left side (when viewed from the front of the IMWDS shown in FIG. 38).
Figure 40:
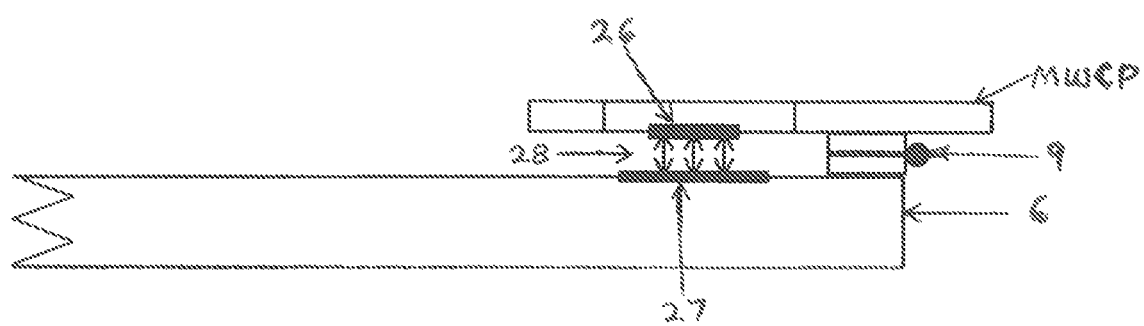
FIG. 40 is an illustration of a front view of a magnet mounted on the AMRA's MWCP and a mating ferrous metal plate mounted on the platform base with the AMRA's MWCP in the disengaged position.
Figure 41:
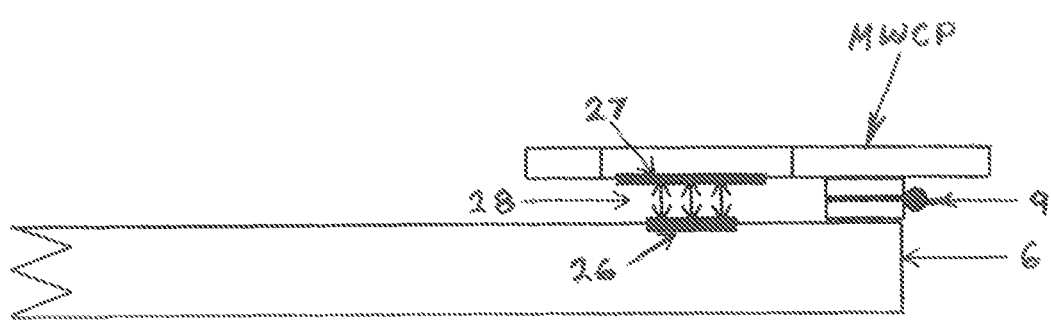
FIG. 41 is an illustration of a front view of a magnet mounted on the platform base and a mating ferrous metal plate mounted on the AMRA's MWCP with the AMRA's MWCP in the disengaged position.
Figure 42:
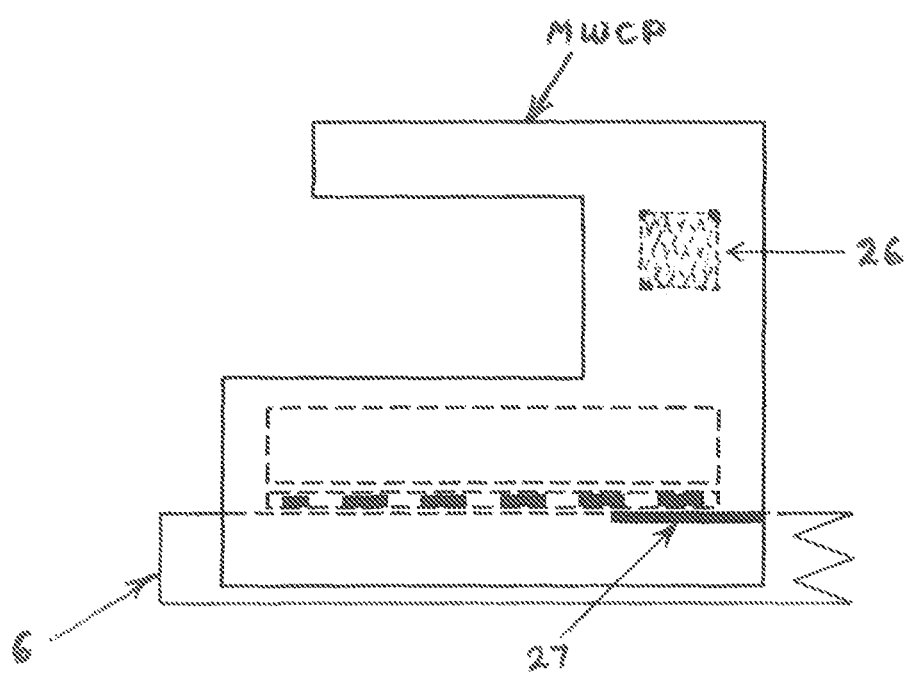
FIG. 42 is an illustration of a side view of a magnet mounted on the AMRS's MWCP and a mating ferrous metal plate mounted on the platform base with the AMRA's MWCP in the engaged position.
Figure 43:
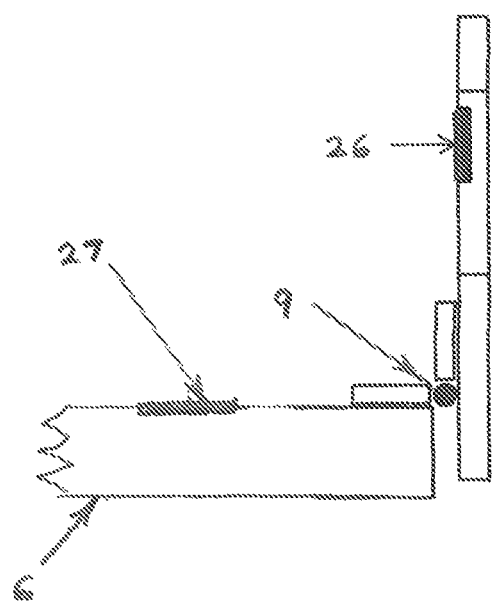
FIG. 43 is an illustration of a front view of a magnet mounted on the AMRA's MWCP and a mating ferrous metal plate mounted on the platform base with the AMRA's MWCP in the engaged position.
Figure 44:
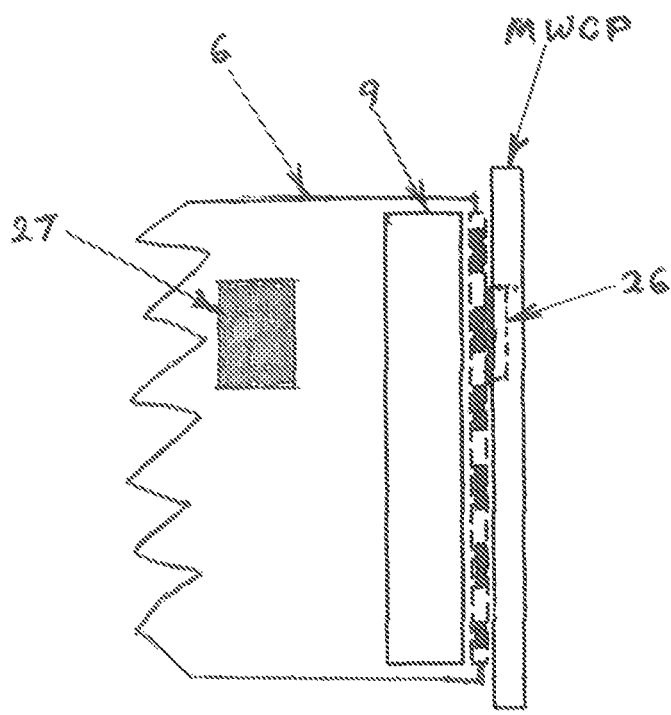
FIG. 44 is an illustration of a top view of a magnet mounted on the AMRA's MWCP and a mating ferrous metal plate mounted on the platform base with the AMRA's MWCP in the engaged position.
Figure 45:
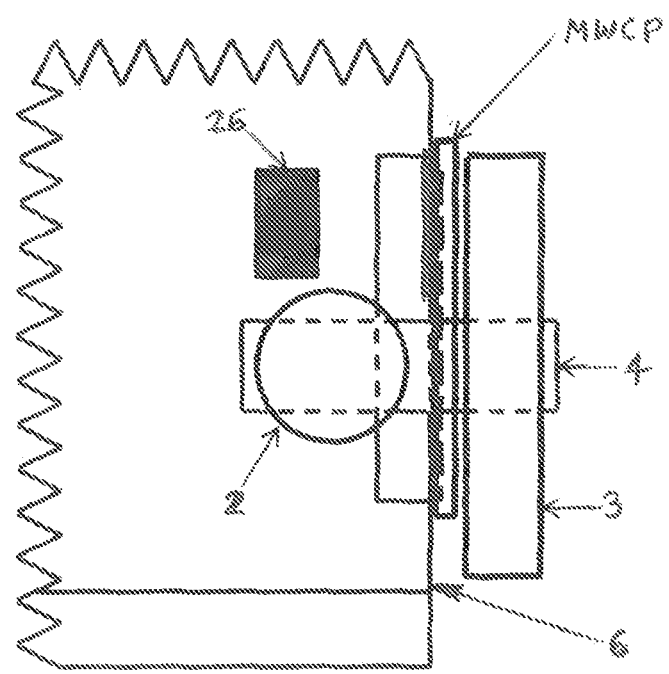
FIG. 45 is an illustration of a top view of a magnet mounted on the platform base and a mating ferrous metal plate mounted on the AMRA's MWCP with AMRA's MWCP in the engaged position and also showing the medical walker's front leg, wheel and axle.
Figure 46:
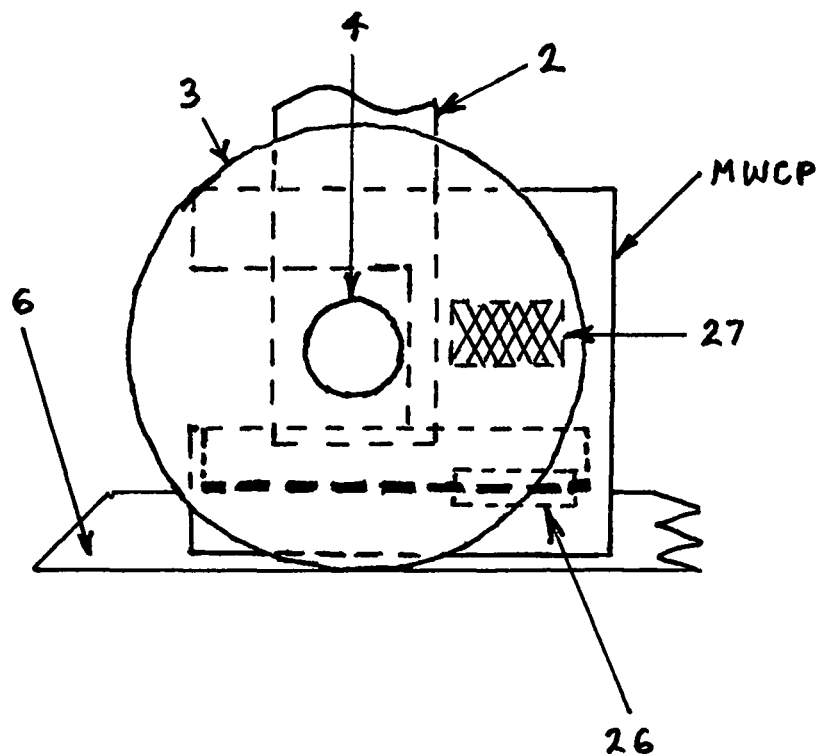
FIG. 46 is an illustration of a side view of a magnet mounted on the platform base and a mating ferrous metal plate mounted on the AMRA's MWCP with AMRA's MWCP in the engaged position and also showing the medical walker's front leg, wheel and axle.
Figure 47:
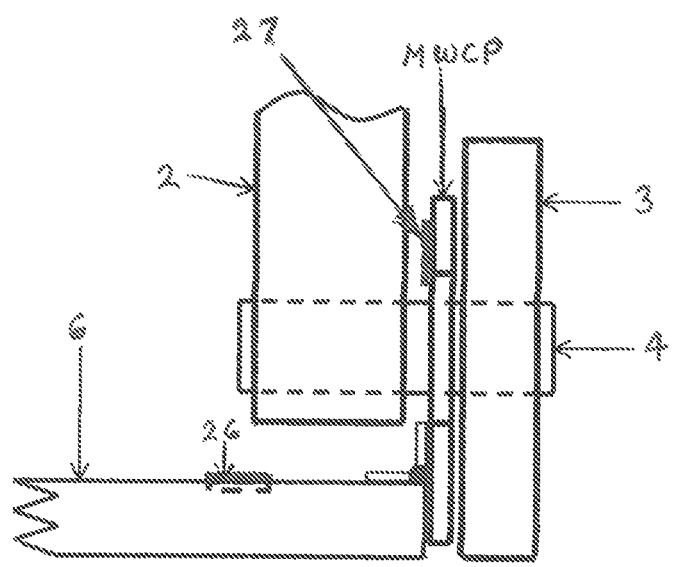
FIG. 47 is an illustration of a front view of a magnet mounted on the platform base and a mating ferrous metal plate mounted on the AMRA's MWCP with AMRA's MWCP in the engaged position and also showing the medical walker's front leg, wheel and axle.

Also shown in FIGS. 36 and 37 is the spacer (21) to fill the gap between the platform base (6) and version A of the APP (18) as version A of the APP (18) is moved away from the platform base (6). FIG. 38 is an illustration of an isometric view of the medical walker (1) captured and secured on the version B of the APP (22) which again, as in the case of version A of the APP (18) allows for the variable distance spread of the inside (23) of the medical walker's front wheels (3) as well as the associated front legs (2) and front axles (4) but accomplishes the adjustable positioning in a different manner as shown in greater detail in FIG. 39. FIG. 39 is an illustration of the underside of only the version B of the APP (22) mounted on the left side with the IMWDS when viewed from the front of the IMWDS (5) shown in FIG. 38. Again, it is because of the variation of the separation distance between the insides (23) of the medical walker's two front wheels (3) among the many different medical walkers (1) that exist that there is a need to have a device to accommodate the many different walkers. As in the case of the version A of the APP (18) each of the two MWCPs are mounted on each of the version B of the APPs (22) which, again, can be variably positioned to vary the distance between each of the MWCPs in the following manner: The variable positioning of the MWCPs is accomplished by rotating a male threaded rod (24) one section of which captures and freely rotates within the version B of the APP (22) and the other section of which resides with in the main platform base (6) via mating female threads. The male threaded rod (24) traps/captures the version B of the APP (22) via raised sections on the male threaded rod (24) located just under the inner and the outer side surfaces of the version B of the APP (22) one side surface being closest to the main platform base (6) and the other side surface being furthest from the main platform base (6). The outermost end of the male threaded rod (24) has a centered recess to mate with a tool employed for the purpose of rotating the male threaded rod (24). Additionally, the outermost end of the male threaded rod (24) is positioned either flush with the outermost side surface of version B of the APP (22) or interior to the outermost side surface of version B of the APP (22). Also, additionally shown in FIG. 39 are two guide pins (25) which guide the version B of the APP (22) towards and away from the main platform base (6). FIGS. 40 and 41 are illustrations of portions of just the IMWDS (5) employing magnets (26) and their mating ferrous metal plates (27) to hold the MWCP down against the platform base (6) via lines of magnetic force (28) when the MWCP is in the disengaged position so that the MWCP does not unsafely "flop back and forth" as the CS version of the IMWDS (5) is transported from one location to another. FIG. 40 shows the magnet (26) located/mounted on the MWCP and the mating ferrous metal plate (27) located/mounted on the main platform base (6) while, conversely, FIG. 41 shows the magnet (26) located/mounted on the main platform base (6) and the mating ferrous metal plate (27) located/mounted on the MWCP again with the MWCP in the disengaged position. It should be noted at this point that with ferrous metal hinges (9) the ferrous metal hinge (9) itself replaces the ferrous metal plate (27) and only a magnet (26) mounted on the ferrous metal hinge (9) is required to hold the MWCP in the disengaged position. FIGS. 42,43 and 44 are illustrations of the side, front and top views respectively of portions of just the IMWDS (5) in the engaged position with the magnet (26) located/mounted on the MWCP and the ferrous metal plate (27) located/mounted on the main platform base (6). FIGS. 45,46 and 47 are illustrations of the top, side and front views respectively of portions of the IMWDS (5) with portions of the medical walker (1) shown in the engaged/captured position with the magnet (26) mounted/located on the main platform base (6) and the mating ferrous metal plates (27) mounted/located on the MWCPs.

The invention claimed is:

1. An improved medical walker docking station stabilizing main platform base device for automatically stabilizing a medical walker to aid the user of the medical walker to rise from a sitting position from an object upon which the user of the medical walker is sitting or at any other time when the user of the medical walker attempts to access the medical walker, where by the weight of the medical walker user standing on the medical walker stabilizing platform base device stabilizes the medical walker stabilizing platform base device which in turn stabilizes the medical walker via an automatic movement restrictor assembly coupled to the medical walker stabilizing main platform base device comprising:

a stand-alone main platform base disposed on a surface and covering an area encompassing multiple legs of the medical walker, such that the medical walker includes two front legs with wheels attached to a lower portion of each front leg via a front axle, stand-alone main platform base being placed adjacent to the object upon which the use of the medical walker is sitting or even adjacent to where the user of the medical walker is standing, an automatic movement restrictor assembly coupled to the main platform base, the automatic movement restrictor assembly when fully automatically engaged disposed perpendicular to the upper surface of the main platform base for engaging with a portion of the medical walker's front axle, said automatic movement restrictor assembly having an engaged position and a disengaged position and can be recessed into the main platform base wherein the engaged position, the automatic movement restrictor assembly's capture plate engages with the medical walker's front axle between the medical walker's front wheel and each medical walker's corresponding front leg such that the automatic movement restrictor assembly restricts movements of the medical walker in a direction perpendicular to the upper surface of the main platform base, but allows movement of the medical walker in a direction parallel with the upper surface of the main platform base which is also parallel to the lower surface of the main platform base and, wherein in the disengaged position the automatic movement restrictor assembly is no longer disposed perpendicular to the upper surface of the main platform base but lies parallel to and flat on or flush with the upper surface of the main platform base, wherein a non-capture/non cut-out portion of said automatic movement restrictor assembly hangs over the side of the main platform base ready to be activated to be disposed perpendicular to the plane of the horizontal surface of the main platform base as each of the two medical walker's front wheels move backwards and depress downwards on the non-capture/non cut-out portion of said automatic restrictor assembly placing the entire automatic movement restrictor assembly in the proper vertical position to capture the medical walker's front axles and thus stabilize the medical walker; and wherein the automatic movement restrictor assembly is attached to the main platform base via a hinge.

* * * * *